US010858080B1

(12) United States Patent
Hartman et al.

(10) Patent No.: US 10,858,080 B1
(45) Date of Patent: *Dec. 8, 2020

(54) SURF WAKE FORMING SYSTEMS AND METHODS WITH GYROSCOPE FORCE VECTOR TRANSLATION

(71) Applicant: Skier's Choice, Inc., Maryville, TN (US)

(72) Inventors: Richard Lawrence Hartman, Twin Lakes, ID (US); Matthew Douglas Brown, Maryville, TN (US); Travis Lane Turley, Maryville, TN (US)

(73) Assignee: Skier's Choice, Inc., Maryville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,038

(22) Filed: Feb. 6, 2020

Related U.S. Application Data

(63) Continuation of application No. 16/593,952, filed on Oct. 4, 2019, now Pat. No. 10,676,166, which is a continuation-in-part of application No. 16/450,435, filed on Jun. 24, 2019, now Pat. No. 10,479,461, which is a continuation of application No. 16/269,012, filed on Feb. 6, 2019, now Pat. No. 10,370,071, which is a continuation of application No. 16/140,416, filed on Sep. 24, 2018, now Pat. No. 10,202,177, which is a continuation of application No. 16/017,935, filed on Jun. 25, 2018, now Pat. No. 10,112,688, which is a continuation of application (Continued)

(51) Int. Cl.
*B63B 39/06* (2006.01)
*B63B 73/00* (2020.01)
*B63B 32/70* (2020.01)
*B63B 34/70* (2020.01)

(52) U.S. Cl.
CPC ............ *B63B 39/061* (2013.01); *B63B 32/70* (2020.02); *B63B 73/00* (2020.01); *B63B 34/70* (2020.02); *B63B 2039/065* (2013.01)

(58) Field of Classification Search
CPC ....... B63B 39/061; B63B 73/00; B63B 32/70; B63B 34/70; B63B 2039/065; B63B 39/06
See application file for complete search history.

(56) References Cited

U.S. PATENT DOCUMENTS 2,576,744 A 7/1947 Anderson
2,816,521 A 2/1956 Alexander
(Continued)

OTHER PUBLICATIONS

U.S. Appl. No. 13/543,659 to Hartman, filed Jul. 6, 2012.
(Continued)

*Primary Examiner* — Stephen P Avila
(74) *Attorney, Agent, or Firm* — Malhotra Law Firm, PLLC; Deepak Malhotra

(57) ABSTRACT

A wakeboat has a hull, the hull forming a wake when moving forward in the water, with a left quiet region and a right quiet region in the wake. The hull may exhibit rotation around one or more of its roll, pitch, and yaw axes which affects the quiet regions in the wake. A gyroscope supported in the hull may be used to rotate the hull around one or more axes. Such rotation may be used to create a surf left and/or surf right configuration, and measured via one or more sensors. Other systems and methods are also provided.

20 Claims, 14 Drawing Sheets

(not to scale)

Related U.S. Application Data

No. 15/945,711, filed on Apr. 4, 2018, now Pat. No. 10,040,522.

(60) Provisional application No. 62/481,556, filed on Apr. 4, 2017.

(56) References Cited

U.S. PATENT DOCUMENTS

| | | |
|---|---|---|
| 2,949,258 A | 8/1960 | Bell |
| 3,159,131 A | 12/1964 | Frederick |
| 3,200,782 A | 8/1965 | Walden |
| 3,456,610 A | 7/1969 | Beals |
| 3,577,948 A | 5/1971 | Frey |
| 3,628,486 A | 12/1971 | Bennett |
| 3,628,487 A | 12/1971 | Bennett |
| 3,695,204 A | 10/1972 | Bennett |
| 5,193,478 A | 3/1993 | Mardikian |
| 5,263,432 A | 11/1993 | Davis |
| 5,474,013 A | 12/1995 | Wittmaier |
| 5,787,835 A | 8/1998 | Remnant |
| 6,012,408 A | 1/2000 | Castillo |
| 6,105,527 A | 8/2000 | Lochtefeld et al. |
| 6,138,601 A | 10/2000 | Anderson et al. |
| 6,167,830 B1 | 1/2001 | Pilger |
| 6,354,237 B1 | 3/2002 | Gaynor et al. |
| 6,427,616 B1 | 8/2002 | Hagan |
| 6,520,104 B1 | 2/2003 | Svensson |
| 6,941,884 B2 | 9/2005 | Moore |
| 7,063,031 B2 | 6/2006 | Earl, Jr. et al. |
| 7,140,318 B1 | 11/2006 | Gasper |
| 7,381,108 B1 | 6/2008 | Salmon |
| 7,434,531 B1 | 10/2008 | Zsido et al. |
| 7,617,026 B2 | 11/2009 | Gee et al. |
| 7,707,956 B2 | 5/2010 | Moore |
| 7,958,837 B1 | 6/2011 | Fraleigh |
| 8,251,006 B2 | 8/2012 | Kalil |
| 8,387,551 B2 | 3/2013 | Müller |
| 8,434,420 B2 | 5/2013 | Muller |
| 8,539,897 B1 | 9/2013 | Gasper et al. |
| 8,578,873 B2 | 11/2013 | Gasper et al. |
| 8,631,753 B2 | 1/2014 | Morvillo |
| 8,798,825 B1 | 8/2014 | Hartman |
| 9,150,289 B1 | 10/2015 | Brendel |
| 9,174,703 B2 | 11/2015 | Sheedy et al. |
| 9,199,695 B2 | 12/2015 | Gasper et al. |
| 9,233,740 B2 | 1/2016 | Morvillo |
| 9,260,161 B2 | 2/2016 | Gasper |
| 9,278,740 B1 | 3/2016 | Andrasko |
| 9,315,235 B1 | 4/2016 | Wood |
| 9,334,022 B2 | 5/2016 | Gasper et al. |
| 9,446,823 B2 | 9/2016 | Sheedy et al. |
| 9,481,441 B2 | 11/2016 | Morvillo |
| 9,505,464 B1 | 11/2016 | Wood |
| 9,580,147 B2 | 2/2017 | Gasper et al. |
| 9,689,395 B2 | 6/2017 | Hartman |
| 9,828,075 B1 | 11/2017 | Hartman |
| 10,040,522 B1 | 8/2018 | Hartman et al. |
| 10,093,398 B1 | 10/2018 | Hartman |
| 10,112,688 B1 | 10/2018 | Hartman et al. |
| 10,202,177 B1 | 2/2019 | Hartman et al. |
| 10,676,166 B1 * | 6/2020 | Hartman ............... B63B 34/75 |
| 2002/0174818 A1 | 11/2002 | von Wolske |
| 2005/0239351 A1 | 10/2005 | Darby |
| 2008/0028574 A1 | 2/2008 | Mack et al. |
| 2009/0101057 A1 | 4/2009 | Mueller |
| 2013/0228114 A1 | 9/2013 | Gasper |
| 2014/0224166 A1 | 8/2014 | Morvillo |
| 2016/0214681 A1 | 7/2016 | Huyge |
| 2017/0036738 A1 | 2/2017 | Hartman |
| 2017/0217544 A1 | 8/2017 | Sheedy |

OTHER PUBLICATIONS

U.S. Appl. No. 15/824,787 to Hartman et al., filed Nov. 28, 2017.
Wake World, Debut of New Sanger Surf Series V237 2008, Oct. 4, 2008-Feb. 9, 2009, eWake, Inc.
Kaufman, Matt, Power Trim Tabs, May 11, 2011, Blogger.com.
Mastercraft, MasterCraft X2 Tab Controls, 2010, Dec. 30, 2009, YouTube.com.
Mastercraft, MasterCraft X2 Tabs 2010, Dec. 30, 2009, YouTube.com.
Volvo Penta, QL Boat Trim System, 2007, Volvo Penta.
Humphree, Humphree Owner's Manual, 2009, Humphree.
Humphree, Humphree Installation Manual, 2009, Humphree.
Bennett Marine, Inc., Bennett Products & Part Numbers, 2004, Bennett Marine, Inc.
Anonymous, Wakeboarder Forum, Mar. 23-24, 2005, wakeboarder.com.
Lenco Marine, Blade OEM Weld Assy, Dec. 3, 2009.
Haughey, Edmund J., US District Court Eastern District of Tennessee at Knoxville, Case No. 3:16-CV-82-TAV-HBG., filed Nov. 14, 2016.
Lenco Marine, Trim Tab Kits, Jun. 29, 2018.
Wakeboarding Magazine, Zane Schwenk—Mastercraft Surf Tabs, May 26, 2010, still taken from video at YouTube.com.
Boattest.com, Mastercraft X2 2011 Inboard Ski-Wake Boat Reviews by Boattest.com, 2011, still image taken from video at YouTube.com.
Gyro vs Fins—What's the Difference, VEEM Gyro, https://veemgryo.com/gyro-vs-fins-whats-difference, web printed on Oct. 4, 2019.
Rule the Waves, Tohmei Group, antirollinggyro.com/design.html, web printed on Oct. 4, 2019.
Which Seakeeper is Right for You?, Seakeeper 2, https://seakeeper.com/seakeeper_products/seakeeper-2 web printed on Oct. 4, 2019.

* cited by examiner no induced yaw rotation induced yaw rotation via port deployment

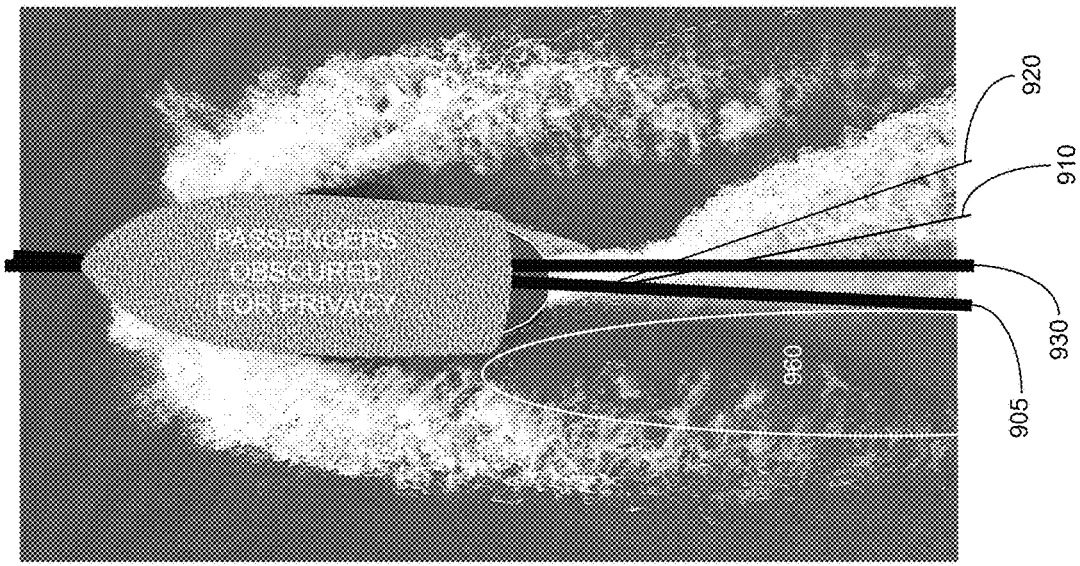
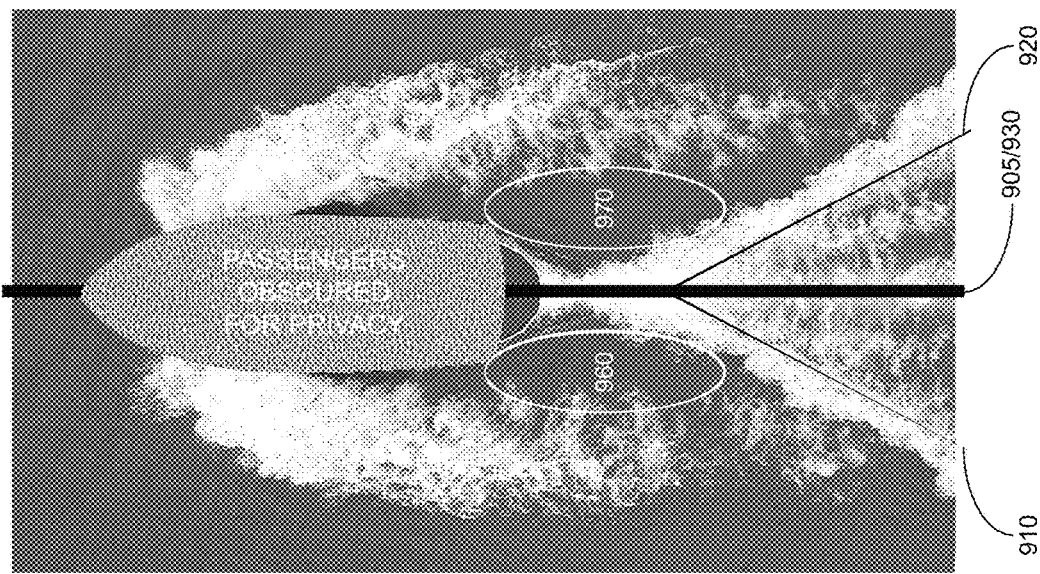

SURF WAKE FORMING SYSTEMS AND METHODS WITH GYROSCOPE FORCE VECTOR TRANSLATION

CROSS-REFERENCE TO RELATED APPLICATION

This is a continuation of U.S. patent application Ser. No. 16/593,952, which is a continuation-in-part of U.S. patent application Ser. No. 16/450,435 filed Jun. 24, 2019, which in turn is a continuation of U.S. patent application Ser. No. 16/269,012 filed Jun. 2, 2019 (now U.S. Pat. No. 10,370,071), which in turn is a continuation of U.S. patent application Ser. No. 16/140,416 filed Sep. 24, 2018 (now U.S. Pat. No. 10,202,177), which in turn is a continuation of U.S. patent application Ser. No. 16/017,935 filed Jun. 25, 2018 (now U.S. Pat. No. 10,112,688), which in turn is a continuation of U.S. patent application Ser. No. 15/945,711 filed Apr. 4, 2018 (now U.S. Pat. No. 10,040,522), which in turn claims priority to U.S. Provisional Patent Application Ser. No. 62/481,556 filed 4 Apr. 2017, all of which name Hartman et al. as inventors and all of which are incorporated herein by reference.

TECHNICAL FIELD

The present disclosure relates to watercraft, and in particular apparatus and methods for affecting the interaction of wakeboat hulls with their surrounding water.

BACKGROUND

Watersports involving powered watercraft have enjoyed a long history. Waterskiing's decades-long popularity spawned the creation of specialized watercraft designed specifically for the sport. Such "skiboats" were optimized to minimize the wake in the water behind the watercraft's hull, thereby providing the quietest possible water to the trailing water skier.

More recently, watersports have arisen at the other extreme by actually taking advantage of, and benefitting from, the wake produced by a watercraft. Sports such as wakesurfing, wakeboarding, wakeskating, kneeboarding, and others use the watercraft's wake to allow the participants to perform various maneuvers or "tricks" including becoming airborne.

To address this changing market, skiboats dedicated to a single watersport have yielded to a new type of watercraft known as a "wakeboat". Wakeboats seek to more completely manage the spectrum of wakes that are produced behind the hull-diminishing it for some activities, while enhancing it for others.

The wake that forms behind the hull of a wakeboat as it moves through water is affected by many factors, including but not limited to the hull's aspect ratio (relationship of length to width), the width of its transom (the rearmost portion of the hull), the velocity of the hull through the water, and the hull's draft (depth in the water).

As mentioned above, modern watersports take advantage of, and benefit from, the wake produced by a wakeboat. For watersports such as wakesurfing, the wake is intentionally made asymmetric: An actual wave is formed behind one side of the hull, thus approximating the unidirectional behavior of a naturally formed ocean wave. A wakesurfing participant can employ a surfboard on the wave behind a wakeboat much as surfboards have historically been used in the ocean, with the wave "breaking left" or "breaking right" depending upon which side of the hull is forming the wave.

An asymmetric wake is formed by the hull having an asymmetrical relationship to the water. One method of introducing asymmetry is to rotate the hull around its longitudinal axis, the axis running lengthwise from the front (bow) to the rear (stern). The result is commonly referred to as "tilt", "roll", or the nautical term "list". A hull that is not level with the water's surface creates an asymmetrical wake as it moves through the water.

One common technique for changing the roll angle of a hull is the use of trim tabs. These comprise plates at or near the transom of the hull, often installed in groups of two or more distributed across the width of the transom, that by angling down into the water below the normal hull profile, cause the moving water to impart a lifting force to the hull. When multiple such trim tabs are deployed in synchronization (e.g. at roughly the same angle), the lifting force is roughly even across the width of the hull and the lifting effect is primarily around the lateral axis—a rotation often referred to as "pitch".

More usefully for asymmetric wake formation, when multiple such trim tabs are deployed in an unsynchronized fashion some amount of the lifting force contributes to rotation around the longitudinal axis—and thus the hull experiences tilt/roll/list as described above.

For example, a trim tab mounted on the left (port) side of the transom, and deployed into the water, will experience a lifting force from the moving water that will lift the left (port) side of the hull and lower the right (starboard) side of the hull—thus rotating the hull around its longitudinal axis. A trim tab mounted on the opposite side, and deployed into the water, will reverse these directions and lift the right (starboard) side of the hull while lowering the left (port) side.

These asymmetrical lifting forces cause the hull to have an asymmetrical relationship to the water, which in turn causes an asymmetrical wake to form behind the hull.

Trim tabs are a very old and well known technology. For example, U.S. Pat. No. 2,576,744 to Anderson (incorporated herein by reference) describes a pair of independently adjustable trim tabs.

U.S. Pat. No. 2,816,521 No. to Alexander (incorporated herein by reference) goes into even greater detail: "blades 6 may be set to various or different angular positions with respect to each other, to insure the boat operating on an even keel regardless of the location of the load or cargo within the hull" (see Col. 2, Lines 31-34).

U.S. Pat. No. 3,159,131 to Frederick (incorporated herein by reference) reiterates the asymmetric effect of trim tabs: "the upward thrust effected by the flaps may be increased or decreased either simultaneously or individually. By increasing and decreasing the downward inclination of the trim flaps the inclination of the hull may be adjusted about both transverse and longitudinal generally horizontally disposed axes" (see Col. 1, Lines 15-21). Thus the use of trim tabs to impart rotation about the transverse (pitch) and longitudinal (roll) axes has a long history in the art.

While trim tabs have a long history of use for hull control, and are in common use today for asymmetrical wakesports, they suffer from certain restrictions. One such restriction is their limited dynamic range. The effects that trim tabs can impart to a hull are limited in scope; plainly stated, there is only so far that a hull can be safely tilted, and that degree of tilt may not, by itself, achieve the desired asymmetry of wake.

Trim tabs alone being insufficient, the achievement of the desired asymmetry of wake may require one or more supplementary techniques.

A second technique for asymmetric wake formation is based on convergence of the disturbed water coming off the two sides of the rear of the hull. As described in U.S. Pat. No. 3,200,782 to Walden (incorporated herein by reference), in the absence of any convergence controlling element "the slip-streams 76 at the two sides pass close to the sides of the boat at 77 and then converge behind the boat at 78" (see Col. 6, Lines 41-43 and FIGS. 10 through 12).

Walden then describes using vertically oriented trim tab elements to delay the convergence: "As shown in FIG. 12, however, when the vanes are used extending upwardly and curving outwardly from the outboard sides of the elevator plates, the slip-stream 77' flares outward at 80 in the wake" (see Col. 6, Lines 45-48 and FIG. 12). Walden both describes, and illustrates, delaying the convergence of the wake formed behind a hull using vertically oriented trim tab elements.

While Walden may have originated the concept of delayed convergence, it is not without its disadvantages. One such disadvantage is the fixed nature of its delayed convergence. Walden offers no way to adjust the traditional effect of its trim tabs independently from the convergence delaying effect of its vertically oriented trim tab elements.

The concept of delayed convergence via vertically oriented trim tab elements from U.S. Pat. No. 3,200,782 to Walden is later disclosed by Gasper in a series of US Patents including U.S. Pat. No. 9,260,161 which states: "The neutral position of surf wake system 32 is shown in FIG. 13(a) in which flaps 33 are in their neutral, retracted position. In this position, the flow of water past the transom is unimpeded by the flaps and the water is allowed to converge at it is natural intersection relatively close to the transom. When a surfable starboard side wake is desired, the operator may deploy the port side flap 33p as shown in FIG. 13(b). In this position, the flow of water along the port side past the transom is disrupted such that the flow of water is redirected outwardly and/or rearwardly thereby delaying convergence of the port side flow with starboard side flow to a point further from the transom." (see Col. 12, Lines 23-38 and FIGS. 13a and 13b.)

As with FIGS. 10 through 12 of U.S. Pat. No. 3,200,782 to Walden, FIGS. 13a and 13b of U.S. Pat. No. 9,260,161 to Gasper show the use of vertically oriented trim tab elements to delay the convergence of wakes behind the hull of a boat.

Gasper describes its vertically oriented trim tabs as a "pair of upright water diverters including a port diverter and a starboard diverter" (see Col. 2, Lines 1-2). Gasper requires that "the pivot angle may be substantially vertical, substantially parallel to the side edge, some other angle therebetween, or some angle slightly inclined with respect to the side edge" (see Col. 6, Lines 16-19). The hinge of Gasper is disclosed as being at or near vertical: "the angle between the pivot axis and the side edge is less than approximately 15 degrees, more preferably less than 10 degrees, and even more preferably less than 5 degrees" (see Col. 6, Lines 19-22).

This at- or near-vertical orientation in the Gasper specification is shown in the figures in which all hinges and flaps are at or near vertical. See flaps 33p and 33s of FIG. 1, hinge 37 and flap 33 of FIG. 2, hinge 37p and flap 33p of FIG. 4A, hinge 37p and flap 33p of FIG. 4B, hinges 37p and 37s and flaps 33p and 33s of FIG. 5A, hinges 37p and 37s and flaps 33p and 33s of FIG. 5B, hinges 37p and 37s and flaps 33p and 33s of FIG. 5C, flap 33 of FIG. 10, flap 33 of FIG. 11, flaps 33 of FIG. 12A, hinges 37 and flaps 33 of FIG. 12B, flaps 33p and 33s of FIG. 13A, flaps 33p and 33s of FIG. 13B, flaps 33p and 33s of FIG. 13C, hinges 37 and flap 33 of FIG. 14A, flap 33 of FIG. 14B, hinges 37 and flap 33 of FIG. 15A, flap 33 of FIG. 15B, flap 33 of FIG. 15C, flaps 33 (also labeled "Surf Gate") of FIG. 16A, flaps 33 of FIG. 16B, hinges 37p and 37s and flaps 33p and 33s of FIG. 17, and flaps 33p and 33s of FIG. 18.

The disadvantages of the vertically oriented trim tab elements of Walden have already been addressed above. Chief among these is their fixed nature relative to the horizontally oriented trim tabs to which they are attached.

Likewise, the Gasper requirement that the hinges and flaps of its "upright water diverters" be oriented vertically bears its own disadvantages. For example, the sides of the hull often require recesses to permit the hinges and flaps of Gasper to fully retract out of the "flow of water past the transom". Such recesses complicate hull design and fabrication, and may weaken the structural integrity. They may also compromise aspects of hull design by limiting the freedom of the hull engineer(s) to optimize for hull performance.

More seriously, the Gasper requirement that the hinges and flaps of its "upright water diverters" be oriented vertically may potentially also threaten the safety of nearby persons. When the "upright water diverters" of Gasper are in their deployed positions they extend outboard of the natural curve of the hull and may potentially present an impact and snagging hazard to nearby swimmers or anyone entering the water. Furthermore, the "upright water diverters" of Gasper are articulated by actuators with sufficient power to overcome the extreme water pressure flowing against them—an amount of force sufficient to potentially injure a person or marine animal snagged or entrapped by them. This potential problem of Gasper is compounded by the partial or complete submersion of its "upright water diverters", potentially rendering them almost invisible to the very people to whom they pose a dangerous threat. For at least these reasons, any benefit from the "upright water diverters" of Gasper is potentially outweighed by downside risks.

A third technique, which is a variation on the "delayed convergence" of Walden and Gasper, is described in U.S. Pat. No. 9,315,235 to Wood. Wood discloses a traditional, full width hinged trim tab with "a second pivot axis forward the first pivot axis. The second pivot axis allows for the device to be installed on boats having different shapes, such as differently sloped transoms" (see Col. 2, Lines 19-22). The second pivot axis of Wood is an installation device, does not play a role in wake creation, and is required to span the entire width of the trim tab.

The first pivot axis of Wood is angled such that "when the water deflectors 216 rotate downwardly, they deflect water in the outboard direction as the boat moves forward, which affects the wake" (see Col. 4, Lines 35-37) and "water deflector 216 deflects the water that released from the stern trailing edge 114 downwardly and in the outboard direction, effectively digging a hole in the water behind the boat 100" (Col. 4, Lines 51-53). In other words, Wood is yet another delayed convergence system.

A fourth technique for asymmetric wake formation is proposed in US Patent Application Publication 2013/0228114 by Gasper. Therein is described the addition of secondary, tertiary, or even more rudders along the keel of a boat hull which are linked by a complex linkage system to operate synchronously. The disadvantages of such a system are numerous, including but not limited to additional complexity of hull manufacture, the displacement of other components otherwise preferentially located within the hull in that volume near the keel, the additional piercings of the hull to accommodate the numerous additional rudder shafts, the necessary additional waterproof fittings on the numerous additional rudder shafts to prevent intrusion of the surrounding water into the hull despite the through-hull rotating mechanisms required below the waterline, and the manufacture and cost and ongoing maintenance of the linkage system to coordinate the numerous additional rudders as described and illustrated in the Publication.

It is clear from the above discussion that individually operated trim tabs and delayed convergence of wakes have been areas of research for decades. However, existing proposals for achieving these ends are fraught with limitations, compromises, and in some cases outright hazards.

There is an ongoing need in the wakeboat industry for a surf wake forming system that delivers desirable asymmetric wakes without adding complexity and cost and, in some cases, without adding a potentially dangerous safety risk.

SUMMARY

Various embodiments provide a system that improves the generation of an asymmetric wake, that works with minimal modifications to existing hull designs, enables separate adjustability of its elements, and avoids the creation of hazards in areas likely to be populated with swimmers.

Some embodiments provide means for controllably affecting lift and yaw of one side of the stern of a boat to create an asymmetric wake behind the boat. In some embodiments, the means for controllably affecting lift and yaw comprises a trim tab including a main tab portion pivotably supported from the stern of the boat for rotation about a first axis, and a yaw tab portion pivotably supported from the main tab portion for rotation about a second axis non-parallel with the first axis.

Some embodiments provide a system for forming asymmetric surf wakes behind a wakeboat including a hull having a port side, a starboard side, an inside, an outside, a stern, a roll axis, a pitch axis, and a yaw axis, the hull being configured to float in water with a waterline on the outside of the hull, the hull when moving forward in the water creating a wake with a left quiet region and a right quiet region, the system comprising: a left trim tab pivotally supported by the hull proximate the port side of the stern for rotation about a first tab axis that is substantially parallel with the waterline when the hull is at rest in the water; a right trim tab pivotally supported by the hull proximate the starboard side of the stern for rotation about a second tab axis that is substantially parallel with the waterline when the hull is at rest in the water; and a gyroscope including a rotor and a frame, the rotor rotatably supported by the frame, the frame rotatably supported by the hull, the rotor configured to selectively spin within the frame on a first gyroscope axis, the frame configured to selectively spin within the hull on a second gyroscope axis which is non-parallel with the first axis.

Other embodiments provide a method of manufacturing a wakeboat including a hull having a port side, a starboard side, an inside, an outside, a stern, a roll axis, a pitch axis, and a yaw axis, the hull being configured to float in water with a waterline on the outside of the hull, the hull when moving forward in the water creating a wake with a left quiet region and a right quiet region, the method comprising: pivotally supporting a left trim tab by the hull proximate the port side of the stern for rotation about a first tab axis that is substantially parallel with the waterline when the hull is at rest in the water; pivotally supporting a right trim tab by the hull proximate the starboard side of the stern for rotation about a second tab axis that is substantially parallel with the waterline when the hull is at rest in the water; and pivotally supporting a gyroscope frame by the hull, pivotally supporting a gyroscope rotor with the frame, selectively spinning the gyroscope rotor within the frame on a first gyroscope axis, and selectively spinning the gyroscope frame within the hull on a second gyroscope axis which is non-parallel with the first axis.

Still other embodiments provide a system for forming asymmetric surf wakes behind a wakeboat including a hull having a port side, a starboard side, an inside, an outside, a stern, a roll axis, a pitch axis, and a yaw axis, the hull being configured to float in water with a waterline on the outside of the hull, the hull when moving forward in the water creating a wake with a left quiet region and a right quiet region, the system comprising: a left trim tab pivotally supported by the hull proximate the port side of the stern for rotation about a first tab axis that is substantially parallel with the waterline when the hull is at rest in the water; a right trim tab pivotally supported by the hull proximate the starboard side of the stern for rotation about a second tab axis that is substantially parallel with the waterline when the hull is at rest in the water; and a gyroscope including a rotor and a frame, the rotor being rotatably supported by the frame, the rotor being configured to selectively spin within the frame about a first gyroscope axis, the frame being rotatably supported by the hull for rotation about a second gyroscope axis, non-parallel with the first gyroscope axis, in a selective one of a first frame rotation direction, and a second frame rotation direction opposite the first frame rotation direction.

Still other embodiments provide a system for forming asymmetric surf wakes behind a wakeboat including a hull having a port side, a starboard side, an inside, an outside, a stern, a roll axis, a pitch axis, and a yaw axis, the hull being configured to float in water with a waterline on the outside of the hull, the hull when moving forward in the water creating a wake with a left quiet region and a right quiet region, the system comprising: tab means, for creating an adjustable asymmetric wake in the water by interacting with the water to controllably adjust both trim and yaw; and a gyroscope including a rotor and a frame, the rotor being rotatably supported by the frame, the rotor being configured to selectively spin within the frame about a first gyroscope axis, the frame being rotatably supported by the hull for rotation about a second gyroscope axis, non-parallel with the first gyroscope axis, in a selective one of a first frame rotation direction, and a second frame rotation direction opposite the first frame rotation direction, to affect the asymmetric wake.

BRIEF DESCRIPTION OF THE VIEWS OF THE DRAWINGS

FIG. 10A shows a top view of a boat equipped with one embodiment of the disclosure, without induced yaw rotation.

FIG. 10B shows a top view of a boat with induced yaw rotation via starboard deployment, according to some embodiments.

DETAILED DESCRIPTION OF SOME EMBODIMENTS

This disclosure is submitted in furtherance of the constitutional purposes of the U.S. Patent Laws "to promote the progress of science and useful arts" (Article 1, Section 8).

Attention is directed towards the following patents, all of which are incorporated herein by reference: U.S. Pat. No. 8,798,825 issued to Hartman on Aug. 5, 2014; U.S. Pat. No. 9,828,075 issued to Hartman on Nov. 28, 2017; U.S. Pat. No. 9,689,395 issued to Hartman on Jun. 26, 2017 and U.S. Pat. No. 10,093,398 issued to Hartman on Oct. 9, 2018, all of which are assigned to Skier's Choice of Maryville Tenn. Attention is also directed towards U.S. Patent Application Publication No. 2007/0036738 to Hartman, Published Feb. 9, 2017, and to U.S. patent application Ser. No. 15/824,787, filed Nov. 28, 2017, both of which are assigned to Skier's Choice of Maryville Tenn., and both of which are incorporated herein by reference. Attention is also directed to commonly assigned U.S. patent application Ser. No. 16/139, 847, filed Sep. 24, 2018, naming Hartman et al. as inventors, and incorporated herein by reference.

The assemblies and methods of the present disclosure will be described with reference to FIGS. 1-10.

As discussed in the Background section above, a plurality of traditional horizontally oriented trim tabs can impart tilt/roll/list to the hull of a wakeboat via dissimilar angles of deployment. Such rotation causes the hull to have an asymmetric relationship to the water, thus forming an asymmetric wake behind the moving hull.

The present disclosure improves upon a traditional horizontally oriented trim tab by dividing the trim tab into at least two parts, or subtabs. For brevity and ease of understanding this description will refer to a trim tab comprising two subtabs, but it is to be understood that other embodiments can comprise more than two subtabs depending upon the specifics of the application.

In some embodiments of the present disclosure, the primary function of one subtab is to cause the hull to rotate around its roll (also known as the longitudinal, Y, tilt, or list) axis. Meanwhile, the primary function of another subtab is to cause the hull to rotate around its yaw (also known as the vertical or Z) axis—the axis which is oriented primarily vertically, orthogonal to the roll and pitch axes. By imparting yaw rotation to the hull, the hull itself changes the formation of its own wake as it moves forward through the water.

Figure 1:
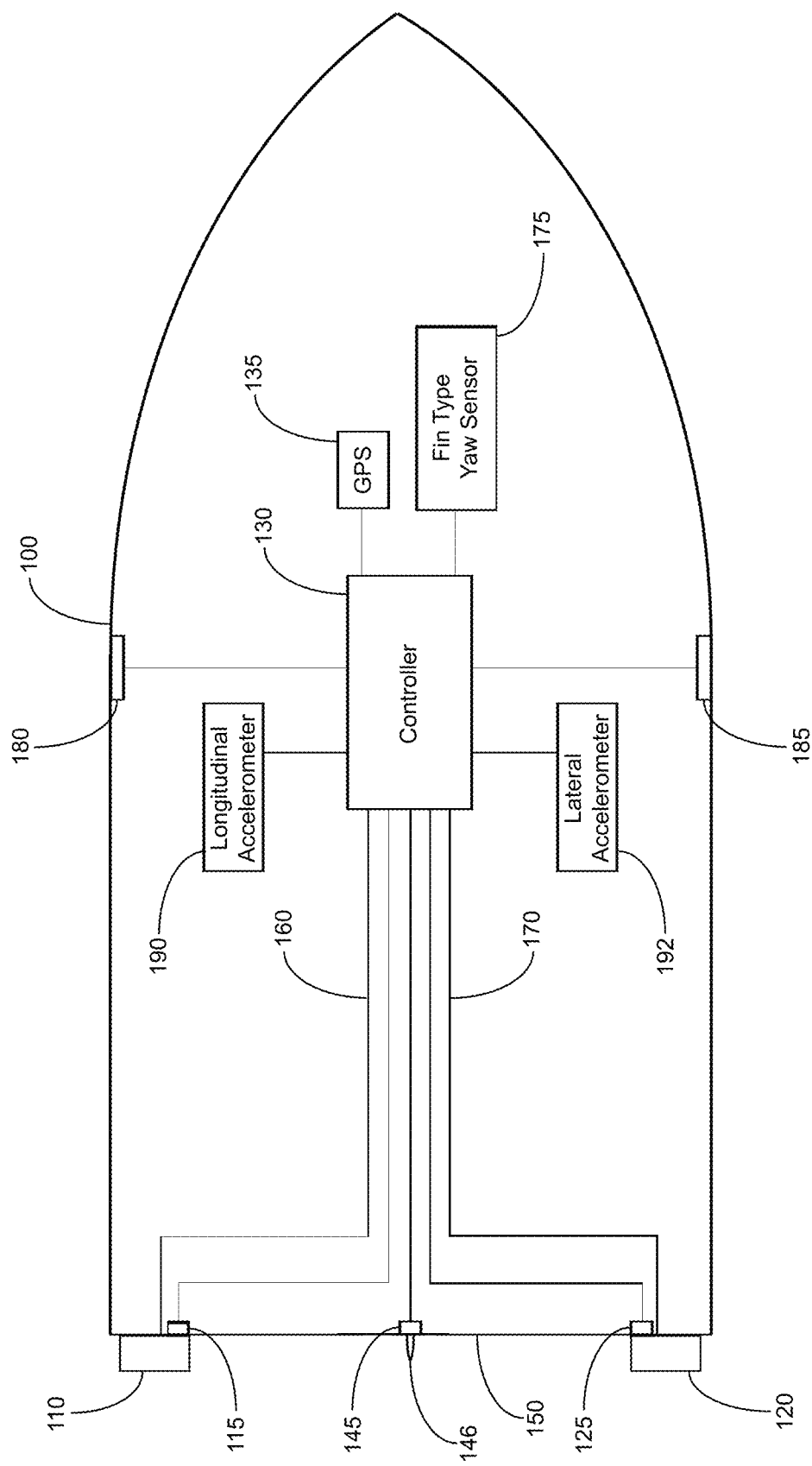
FIG. 1 illustrates a wakeboat according to some embodiments of the disclosure.

FIG. 1 shows a boat 9 in accordance with various embodiments. The boat includes a hull 100 with a left (or port) trim tab 110 and a right (or starboard) trim tab 120 installed at or near transom 150 (rear) of the hull. Some embodiments employ controller 130 to selectively send control signals via connection 160 and connection 170, respectively, to reposition trim tabs 110 and/or 120 as described below. Other embodiments use discrete, user-operated switches to reposition trim tabs 110 and/or 120.

Figure 2:
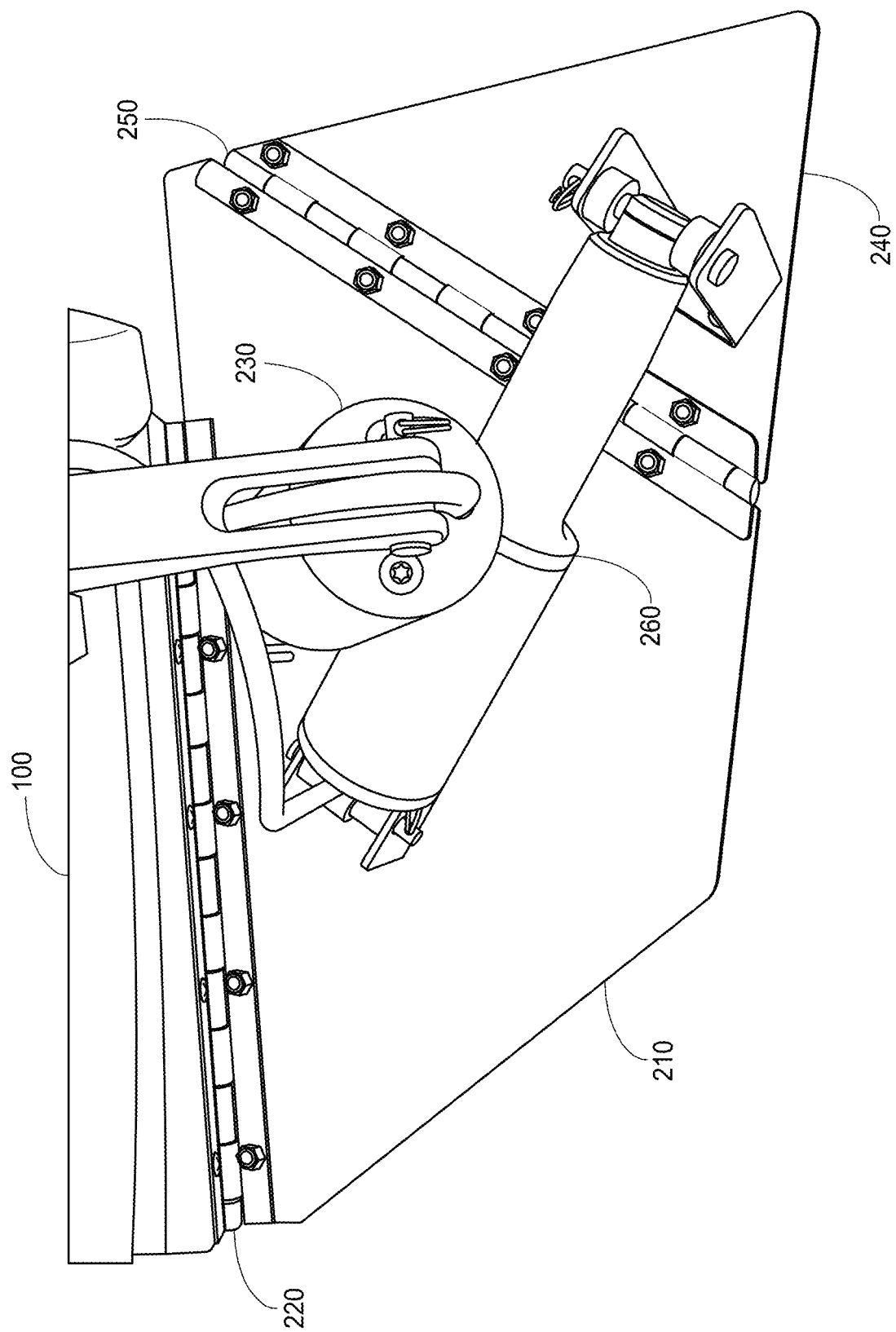
FIG. 2 shows a top view of a trim tab according to some embodiments of the disclosure.

FIG. 2 is a closeup view of the upper surface of port trim tab 110 from FIG. 1. In some embodiments, each trim tab has two subtabs, hereinafter referred to individually as "main tab" and "yaw tab" and collectively as "trim tab". Some embodiments locate the yaw tab at different positions relative to the main tab as suitable for the specifics of the application. The example figures herein illustrate the yaw tabs toward the centerline of the hull but it is to be understood that this does not restrict the yaw tabs from being located elsewhere with respect to the main tabs and/or the hull.

Continuing with FIG. 2, in some embodiments main tab 210 is pivotally connected to hull 100 of FIG. 1 via hinge 220. Hinge 220 may be a traditional hinge, a "living" hinge of flexible material, or another pivotable attachment device suited to the specifics of the application.

The angle of main tab 210 with respect to hull 100 is adjustable, in operation, via main tab actuator 230. Actuator 230 converts a control signal from controller 130 to a physical force that repositions main tab 210. The control signal may be electrical, mechanical, hydraulic, pneumatic, or another signal type suited to the specifics of the application. The resulting physical force from actuator 230 may be based on electromagnetics, mechanics, hydraulics, pneumatics, or another principle suited to the specifics of the application. In some embodiments actuator 230 is mounted between transom 150 and main tab 210 as shown, but other mounting positions and arrangements may be used as suited to the specifics of the application.

Continuing with FIG. 2, in some embodiments yaw tab 240 is pivotally connected to main tab 210 via yaw tab hinge 250. Hinge 250 may be a traditional hinge, a "living" hinge of flexible material, or another pivotable attachment technique suited to the specifics of the application.

The angle of yaw tab 240 with respect to main tab 210 is adjustable via yaw tab actuator 260, in operation. Actuator 260 converts a control signal from controller 130 to a physical movement that repositions yaw tab 240. The control signal may be electrical, mechanical, hydraulic, pneumatic, or another signal type suited to the specifics of the application. The resulting physical movement from actuator 260 may be based on electromagnetics, mechanics, hydraulics, pneumatics, or another principle suited to the specifics of the application. In some embodiments actuator 260 is mounted on the top surface of main tab 210 as shown, but other mounting positions and arrangements may be used as suited to the specifics of the application. For example, in some embodiments actuator 260 is mounted between the transom and yaw tab 240, with controller 130 selectively coordinating the operation of actuator 230 and actuator 260.

In some embodiments, actuator 260 can be a manual adjustment relying on direct operator input instead of a control signal from controller 130. This manual adjustment may be effected in any applicable manner including but not limited to a threaded shaft in place of actuator 260, a hinge 250 that incorporates a positional lock, a block or wedge that establishes the desired angle between yaw tab 240 and main tab 210, or another manner suited to the specifics of the application.

An example of an electrically powered actuator that could be employed for actuator 230 and actuator 260 is the Lenco 15054-001 (Lenco Marine Inc., 4700 SE Municipal Court, Stuart FL 34997). Another example of an electrically powered actuator that could be employed for actuator 230 and 260 is the Bennett BEA2000 (Bennett Marine Inc., 550 Jim Moran Boulevard, Deerfield Beach Fla. 33442). An example of a hydraulically powered actuator that could be employed for actuator 230 and actuator 260 is the Bennett A1101A (Bennett Marine Inc., 550 Jim Moran Boulevard, Deerfield Beach Fla. 33442). For a given embodiment the stroke length, mounting brackets, and other options for the actuator(s) may be selected based on the specifics of that application.

Figure 3:
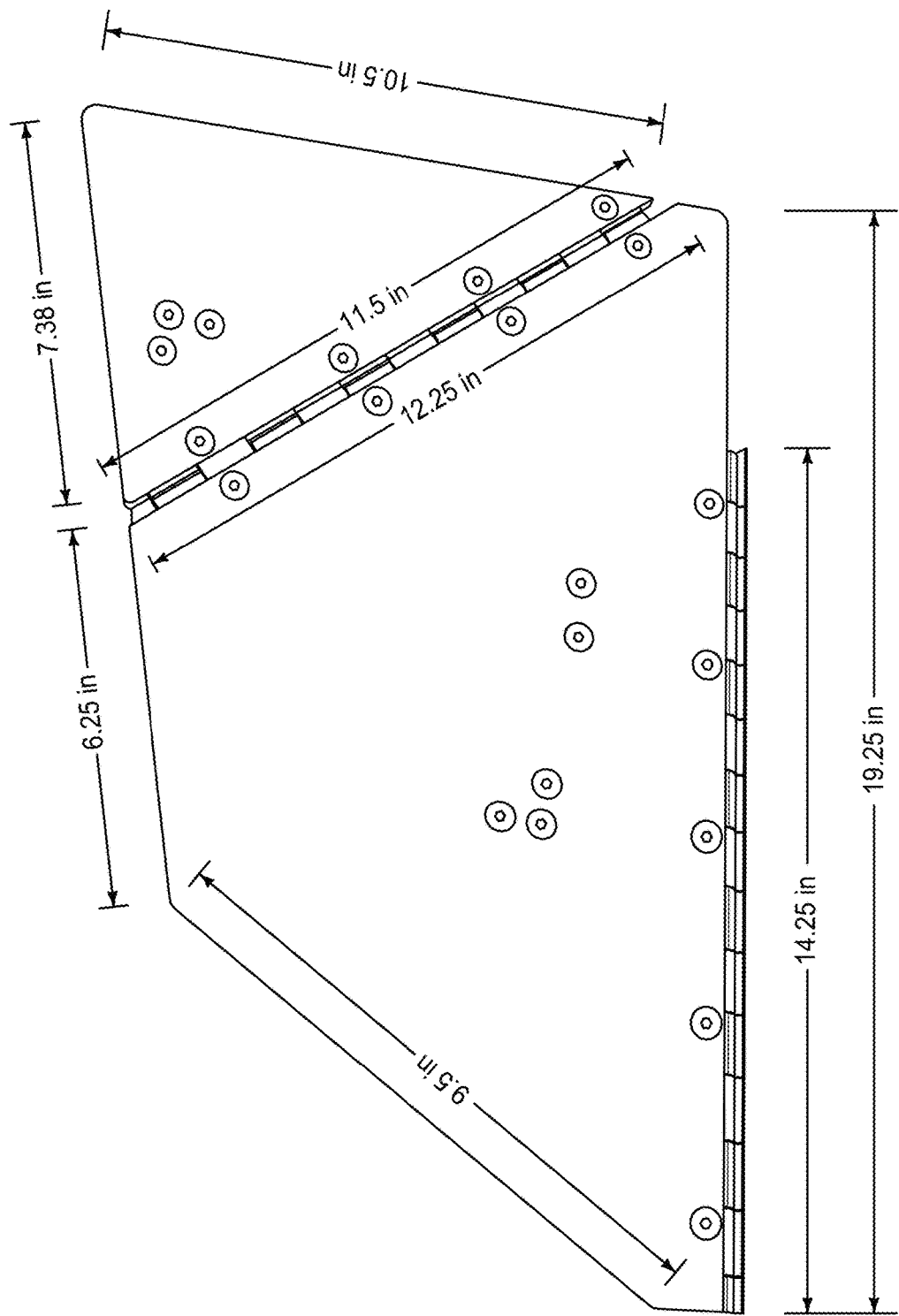
FIG. 3 shows a bottom view and dimensions of a trim tab according to some embodiments of the disclosure.

FIG. 3 is a closeup view of the lower surface of port trim tab 110 showing the dimensions of main tab 210 and yaw tab 240 in some embodiments of the present disclosure. These dimensions, and the relative angles of the edges, may be altered in some embodiments to achieve desired performance. For example, main tab 210 and/or yaw tab 240 may be increased in size so their increased surface areas yield greater forces when used on larger hulls. Conversely, smaller hulls may obtain suitable performance from tabs that are scaled down appropriately.

In some embodiments the sizes, shapes, range of deployment angles, and dimensions of main tab 210 and yaw tab 240 may be altered. This may be useful when the absolute, relative, or ratiometric roll axis force and/or yaw axis force are to be adjusted for the specifics of the application, as will be discussed in more detail below.

In some embodiments, such as that illustrated in FIG. 3, the angle of mounting of yaw tab 240 to main tab 210 is between 35 and 55 degrees. In a more particular embodiment, the angle between the yaw tab 240 and main tab 210 is approximately 45 degrees. Among other effects, this angle balances yaw effect versus hydrodynamic drag, both of which are caused by extending yaw tab 240 into the moving water under the hull of the boat. In some embodiments, this angle is changed to obtain a different relationship between yaw and drag as is suitable for the specifics of the application. Amount of deflection may be more significant than the angle of deflection in creating a desired yaw force, in some embodiments.

Depending upon the specifics of the application, some embodiments may locate yaw tab 240 on the opposite (outboard) side of main tab 210. In such embodiments the relationship of yaw tab side to direction of yaw is reversed, e.g. deployment of an outboard port side yaw tab 240 will impart rotation around the yaw axis of hull 100 toward its port side, instead of the starboard side as shown in earlier examples herein which illustrate an inboard-mounted yaw tab 240. This may be advantageous when, for example, a specific hull design benefits from having an inverse relationship between roll and yaw adjustments from that described above. The non-parallel alignment of hinge 220 and hinge 250 is what allows yaw tab 240 to impart yaw rotation to hull 100; the specific angle of that alignment, and the location of yaw tab 240 in relation to main tab 210, may be changed as suitable for the specifics of hull 100 and its intended application.

Figure 4:
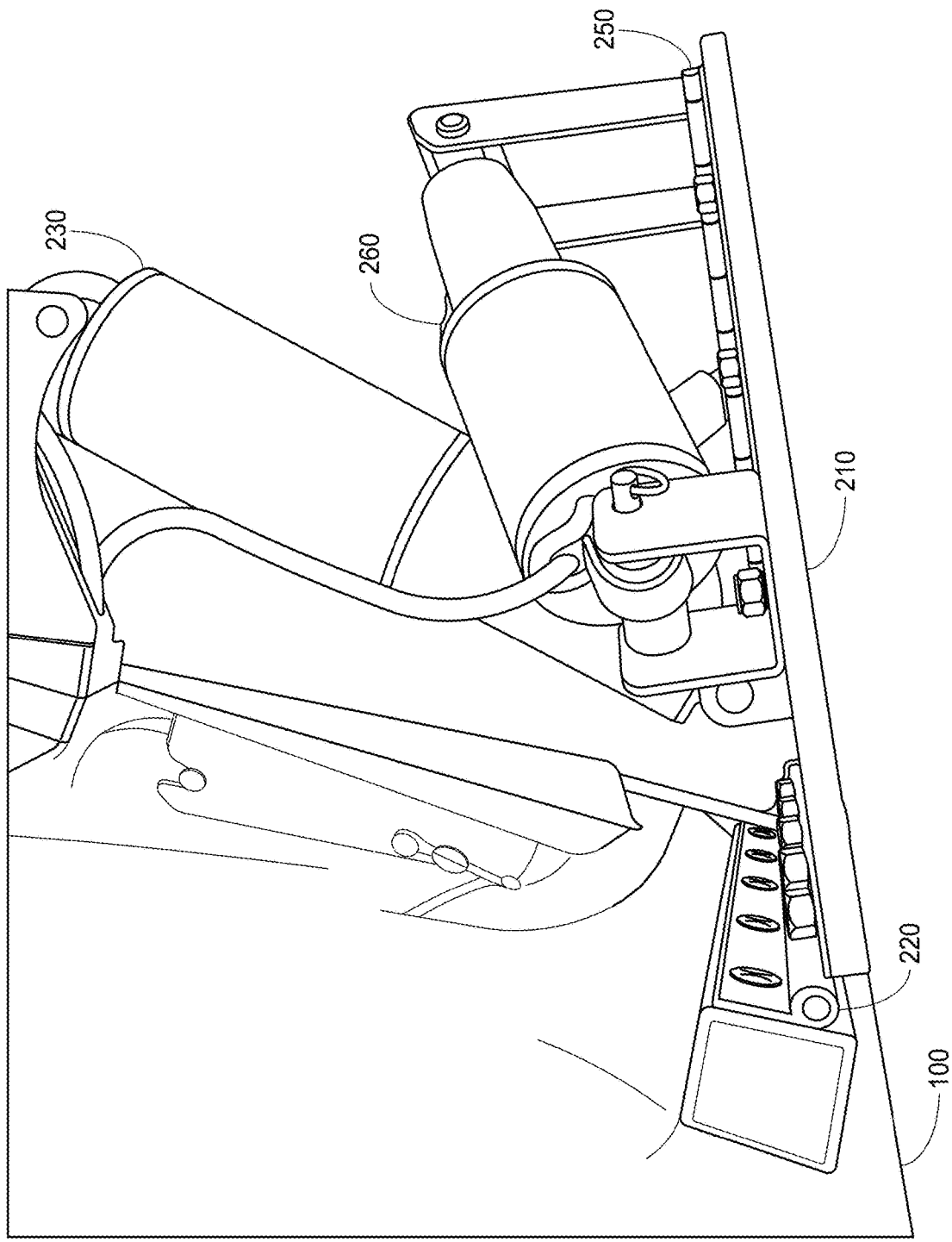
FIG. 4 shows a side view of a trim tab according to some embodiments of the disclosure.

FIG. 4 is a side view of one embodiment having hull 100 with a port trim tab 110. Many of the elements shown in FIG. 3 are again labeled in FIG. 4 for clarity. Main tab 210 and yaw tab 240 are in their retracted positions, such that their bottom planar surfaces are angled generally equal to or above the bottom planar surface of hull 100. In this position, main tab 210 and yaw tab 240 have minimal interaction with the water, and therefore experience minimal forces from the water moving under them as the hull proceeds forward.

In the embodiment of the present disclosure shown in FIG. 4, main tab 210 and yaw tab 240 (obscured in this view) are linearly aligned when the trim tab is retracted. In other embodiments, different angles of retraction may be used as suitable for the specifics of the application.

Figure 5:
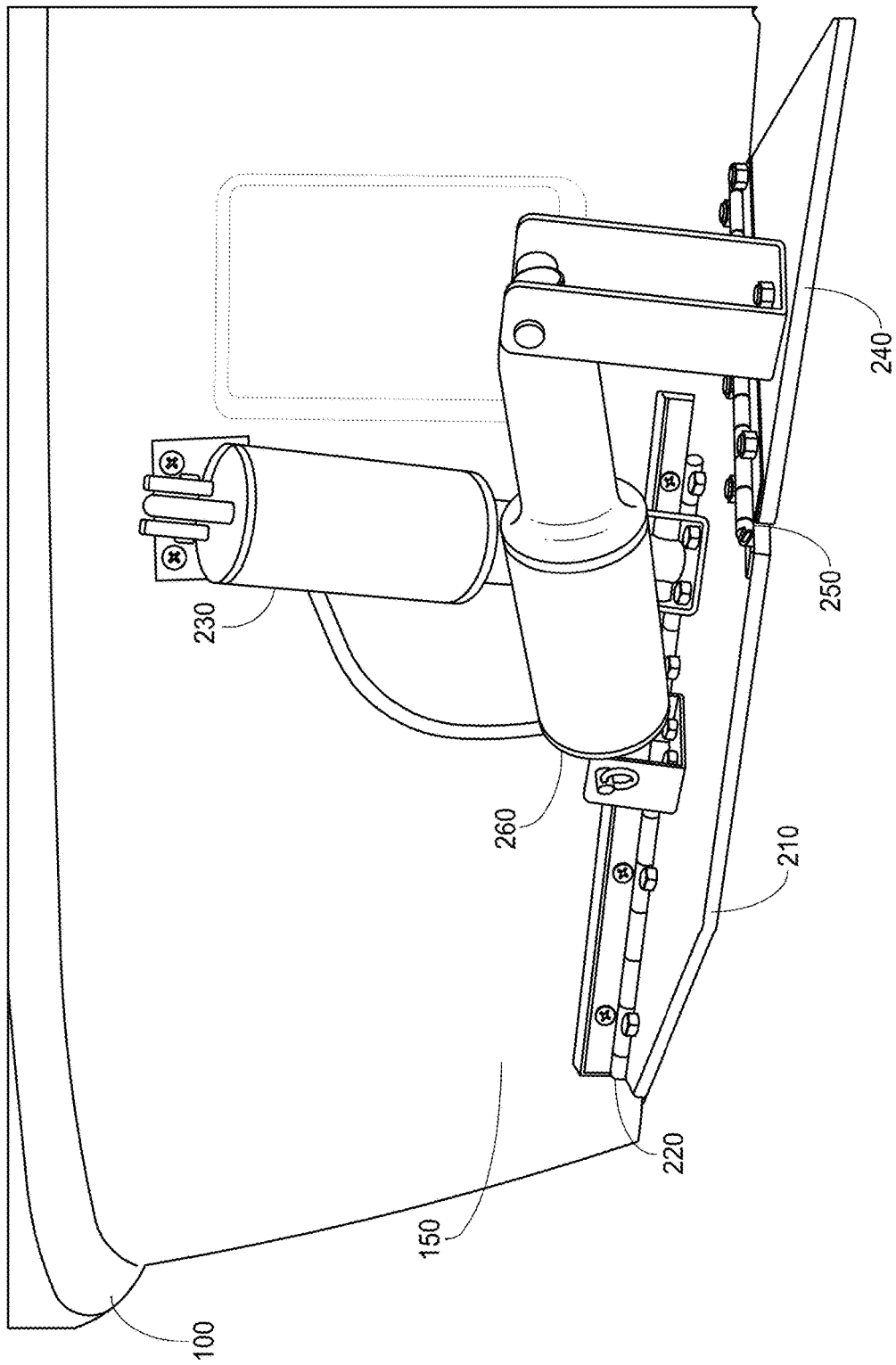
FIG. 5 shows a rear view of a trim tab according to some embodiments of the disclosure.

FIG. 5 is a rear view of hull 100 with port trim tab 110, still in its retracted position. The planar alignment of main tab 210 and yaw tab 240 in this embodiment are clearly distinguishable in this perspective, as is the equal-or-greater-than angular relationship of trim tab 110 to the bottom planar surface of hull 100.

Figure 6:
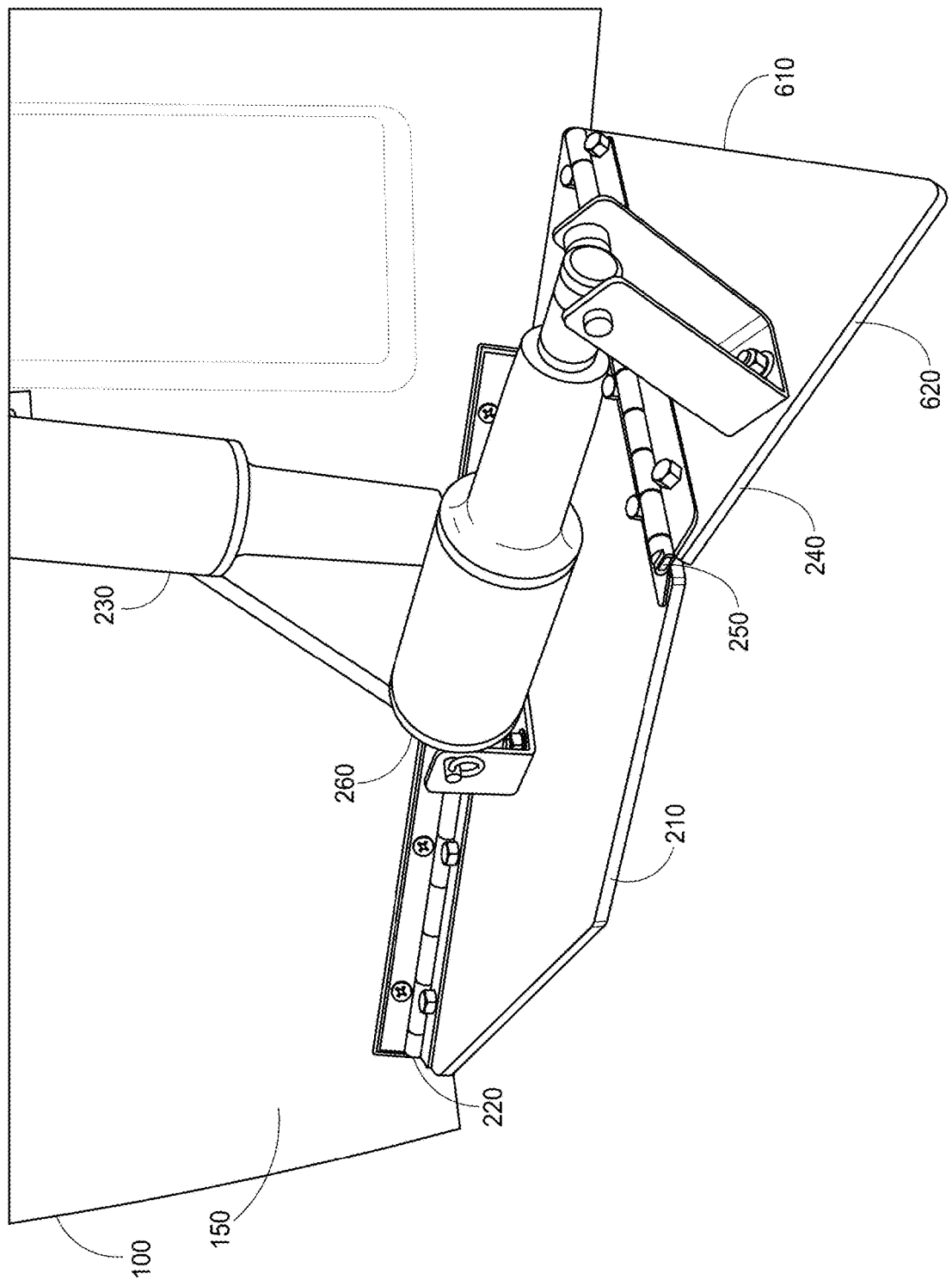
FIG. 6 shows a rear view of a trim tab according to some embodiments of the disclosure.

To impart yaw to the hull, some embodiments deploy the main and trim tabs below the bottom planar surface of the hull. FIG. 6 is a rear view of hull 100 with main tab 210 and yaw tab 240 deployed. In this embodiment, axis of main tab hinge 220 is substantially parallel with transom 150 of hull 100. This causes main tab 210 to remain substantially parallel with transom 150 of hull 100 as it translates through the range of its rotation. Main tab 210 may instead be mounted with its pivot axis substantially parallel to the waterline when the hull is at rest in the water, or another orientation that directs a majority of the lifting force experienced by main tab 210 to imparting rotation of hull 100 around its lateral/pitch axis.

In contrast, the effect of yaw tab hinge 250 being at an angle relative to main tab hinge 220 (and thus to transom 150 of hull 100) is now evident. As actuator 260 imparts downward movement to yaw tab 240, the axis of yaw tab hinge 250 causes the planar alignment of yaw tab 240 to be non-parallel with respect to transom 150 of hull 100 as it translates through the range of its rotation.

Continuing with FIG. 6, as hull 100 moves forward water impinges upon the leading face of yaw tab 240. The effect is like a rudder: Yaw tab 240 will experience a sideways force toward leading edge 610 and away from trailing edge 620. In this embodiment, deployment of yaw tab 240 on a port trim tab when hull 100 is moving forward through water will impart a sideways force against yaw tab 240 toward the opposite (starboard) side of hull 100.

Yaw tab 240 conveys that starboard force through yaw tab hinge 250 to main tab 210. Main tab 210 then conveys the starboard force through main hinge 220 to transom 150. Finally, hull 100 reacts to the starboard force at transom 150 by shifting its transom to starboard (right).

Were this starboard force applied to hull 100 in line with its center of mass, hull 100 would "shift" to the right without rotation. However, since the starboard force is applied at one end of hull 100, that end—the stern, where transom 150 is located and the force is being applied—experiences the majority of the starboard force and the imbalance of force along the length of hull 100 causes it to react unevenly along its length. The result is that hull 100 rotates rather than shifts sideways.

Figure 7A:
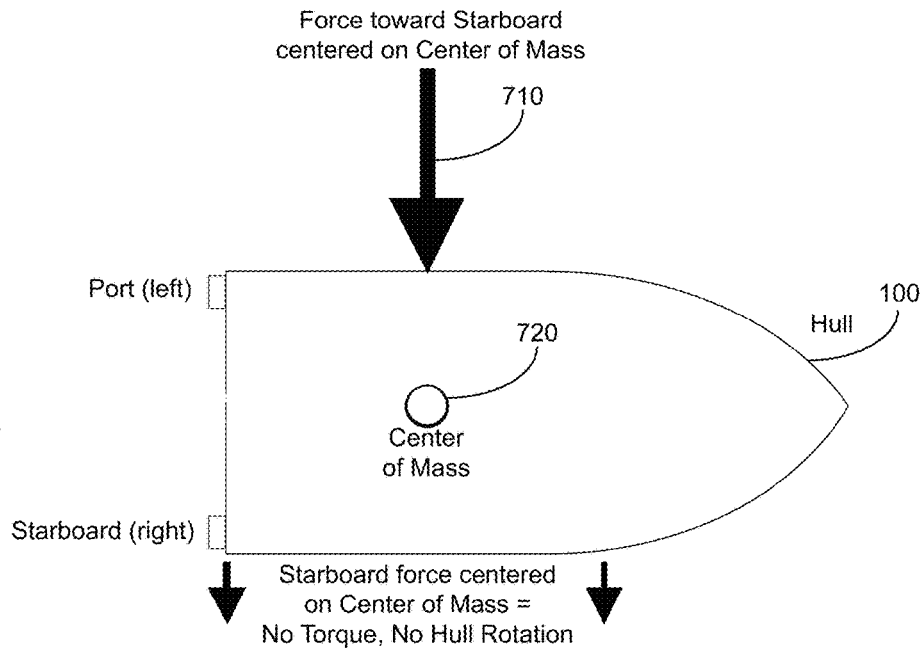
FIG. 7A illustrates force acting on a hull, centered on a center of mass, according to some embodiments of the disclosure.
Figure 7B:
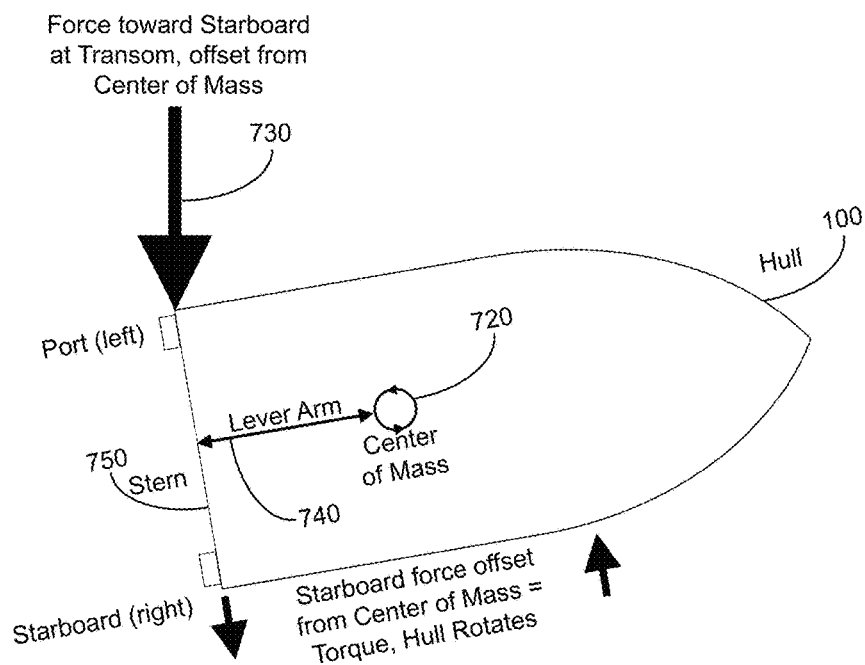
FIG. 7B illustrates force acting on a hull, offset from a center of mass, according to some embodiments of the disclosure.

For better understanding of this effect, it is illustrated in FIGS. 7A and 7B (this discussion, FIG. 7A, and FIG. 7B are simplified for clarity). Referring to FIG. 7A, if starboard force 710 were applied to hull 100 in line with the center of mass 720 of hull 100, hull 100 would experience equal force fore and aft of its center of mass. With equal forces on both sides of its center of mass, hull 100 would not experience a rotative force (no torque) and its reaction to starboard force 710 would be to shift sideways in the water toward its starboard side in proportion to the magnitude of starboard force 710.

In contrast, FIG. 7B illustrates the behavior caused by the illustrated embodiment of the present disclosure. Starboard force 730 is applied to hull 100 at or near its stern 750, well aft of the center of mass 720 of hull 100. The forces on the two sides of center of mass 720 are now significantly unequal. The lever arm represented by distance 740 (the distance from the center of mass 720 to the stern 750 of hull 100) converts starboard force 730 to a rotative torque acting on stern 750. Meanwhile, since substantially all of starboard force 730 is applied at or near stern 750, virtually no component of starboard force 730 acts upon hull 100 forward of center of mass 720. With torque acting on stern 750, and little to no opposing component acting forward of center of mass 720, the result is that, in this example, hull 100 rotates counter-clockwise as viewed from above. Stated differently, stern 750 moves in the direction of leading edge 610 of yaw tab 240 and opposite the direction of trailing edge 620 of yaw tab 240.

Figure 8:
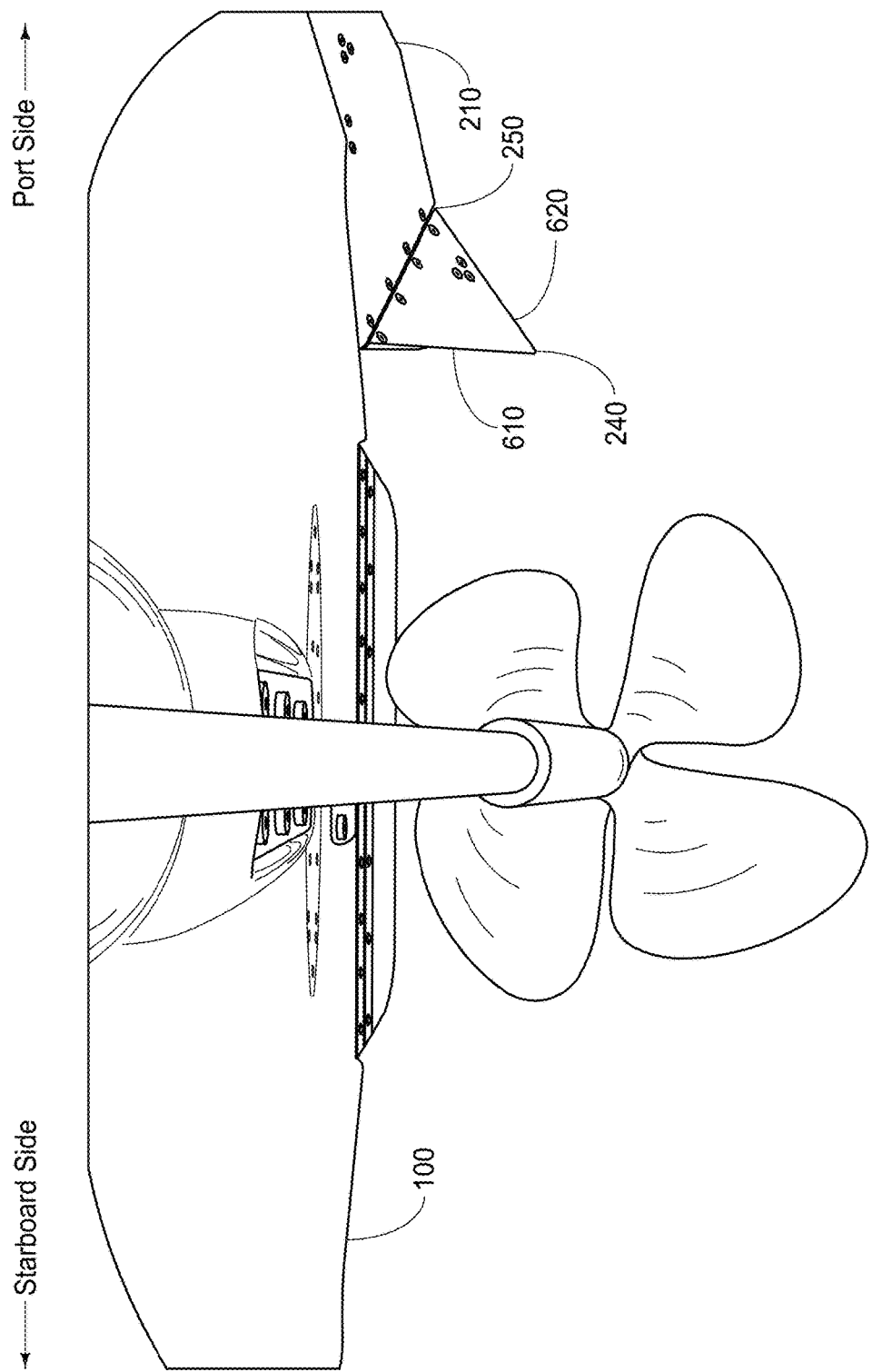
FIG. 8 shows an under-hull view of a trim tab according to some embodiments of the disclosure.

To better visualize this effect in the context of hull 100 in water, FIG. 8 shows a "water's eye view" of hull 100 equipped with one embodiment of the present disclosure, where port trim tab 110 has been deployed. The perspective is from the bow (front) of hull 100, looking toward stern 750, under the hull as if hull 100 is moving forward through the water.

Proceeding with FIG. 8, main tab 210 and yaw tab 240 of this embodiment have been deployed down into the water. Main tab 210 remains parallel to transom 150 due to hinge 220 (not visible in FIG. 8) as explained above. Yaw tab 240 is non-parallel to transom 150 due to hinge 250, also as explained above. As water passes under hull 100 and impinges upon deployed yaw tab 240, yaw tab 240 experiences a force toward leading edge 610 which, in this embodiment, is toward the starboard side of hull 100 (to the left in FIG. 8). This force is conveyed from yaw tab 240 to hull 100 as described above, resulting in the stern of hull 100 moving toward its starboard side and hull 100 rotating around its center of mass, also as described above.

In short, in this example embodiment, deployment of port yaw tab 240 causes hull 100 to rotate around its yaw axis, with its stern (rear) rotating to starboard and its bow (front) rotating to port.

Figure 9A:
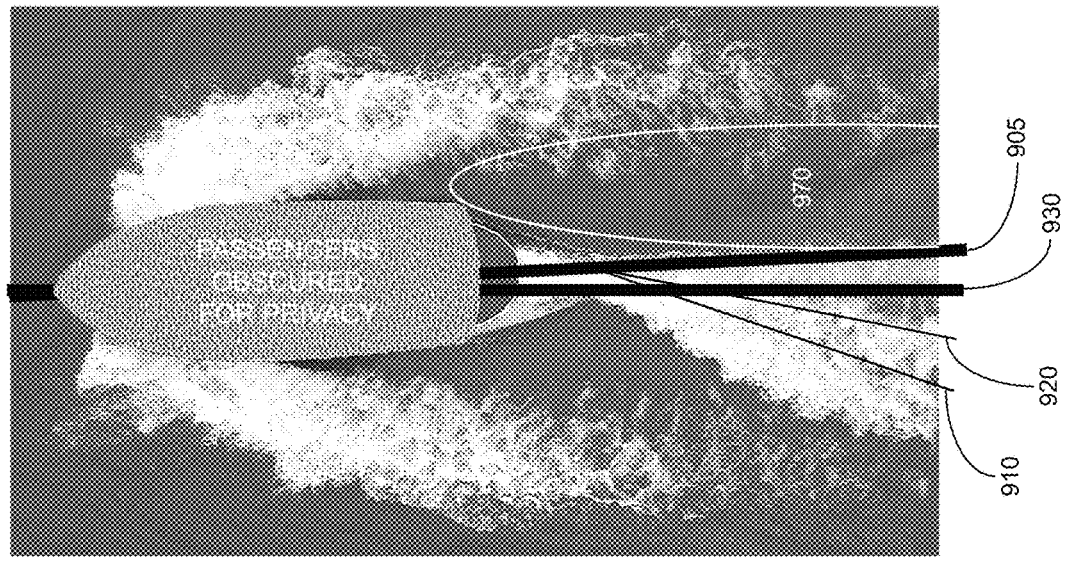
FIG. 9A shows a top view of a boat equipped with one embodiment of the disclosure, without induced yaw rotation.
Figure 9B:
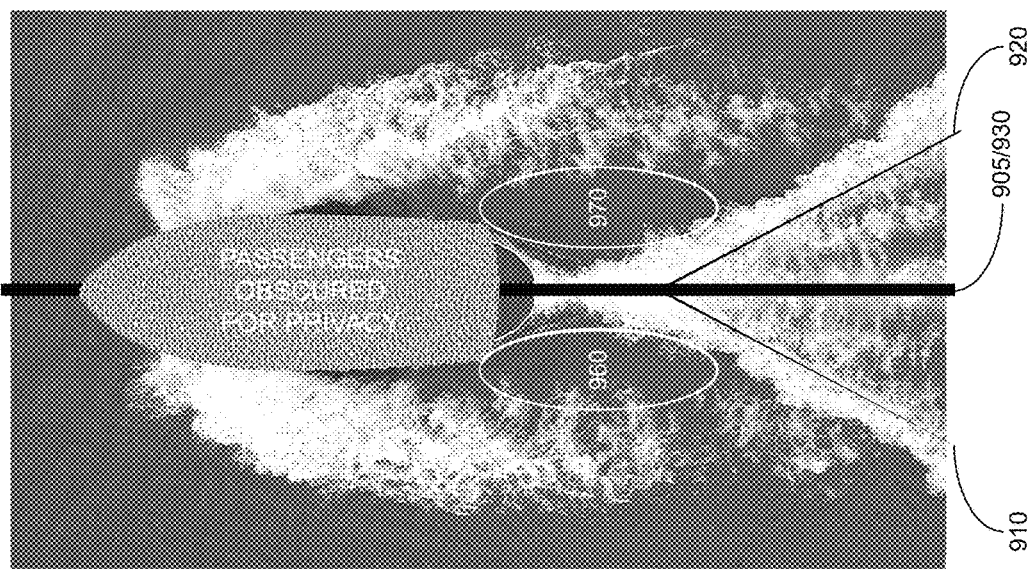
FIG. 9B shows a top view of a boat with induced yaw rotation via port deployment, according to some embodiments.

To enhance clarity and understanding, FIGS. 9A and 9B are top-down photographs of this embodiment being demonstrated on an actual boat in water. (The boat interiors have been obscured to preserve the privacy of the individuals on board.) FIG. 9A shows the boat of FIG. 8 proceeding forward in water with both of this embodiment's trim tabs retracted. The hull's heading 905 (the direction it is pointing) and its course 930 (the direction it is moving) are approximately colinear. Expressed in 3D coordinate axis terms, there is minimal rotation of the hull on its yaw axis. As a result, the hull has a generally symmetrical relationship with the water.

As noted earlier, a generally symmetrical hull relationship TO the water yields a generally symmetrical wake behind the hull IN the water. And so it is in FIG. 9A: Port disturbance 910 and starboard disturbance 920 are generally symmetrical, with the white froth of their disturbances generating a region of convergence behind the hull of the boat that is also generally symmetrical. There is a small, generally quiet region 960 of water behind the port (left) side of the hull and a small, generally quiet region 970 of water behind the starboard (right) side of the hull.

FIG. 9B reveals the effect of this embodiment of the present disclosure when its port main tab and port yaw tab are deployed down into the water. As the overlay lines of FIG. 9B make clear, the hull's heading 905 (the direction it is pointing, which is also its longitudinal axis) and course 930 (the direction it is moving) have diverged and now differ by a significant amount. Expressed more simply, the hull has been rotated on its yaw axis by the processes described in the preceding paragraphs.

Naturally, a boat hull rotates when changing direction (turning). Therefore it is important to note in FIG. 9B that the hull's course is still a straight line. The hull has not changed the direction it is moving; this embodiment of the present disclosure has rotated the hull around its yaw axis (its longitudinal axis points along line 905) while the hull continues to travel forward in a straight line (along line 930).

Comparing FIG. 9A with FIG. 9B, the effect of this embodiment on the wake behind the hull is immediately apparent. In FIG. 9A, port disturbance 910 and starboard disturbance 920 coming off the two sides of the hull are generally symmetrical because this embodiment's main tab and yaw tab are not significantly engaged with the water. But in FIG. 9B, with this embodiment's port main tab and port yaw tab deployed and thus the stern (rear) of the hull rotated around its yaw axis such that its stern is rotated to the right (starboard), port disturbance 910 and starboard disturbance 920 are now noticeably asymmetrical, as desired. Likewise, the region of reconvergence behind the hull of the boat is also noticeably asymmetrical: Almost all of the froth and disturbance has been shifted to the left (port) side, leaving the starboard (right) side quiet and clear, again as desired.

This asymmetry is caused by the hull yaw angle. Where in FIG. 9A the port and starboard trailing edges of the hull had a generally symmetrical relationship to the direction of hull movement, in FIG. 9B the yaw angle of the hull has given the port and starboard trailing edges of the hull an asymmetrical relationship to the direction of hull movement. As a result, port disturbance 910 and starboard disturbance 920 are asymmetrical, which in turn relocates region of convergence toward the port (left) side as compared with its original, unyawed-hull position in FIG. 9A.

The effect on the wake behind the hull is clearly visible in FIG. 9B: Quiet region 970 behind the right rear of the hull is noticeably longer and wider than in FIG. 9A. Indeed, it extends so far behind the hull of the wakeboat that it exceeds the boundaries of FIG. 9B's top view.

In this embodiment, the opposite yaw rotation (not shown in FIG. 9A and FIG. 9B) is obtained by deployment of a starboard yaw tab. FIG. 10A and FIG. 10B illustrate this opposite-side effect for this embodiment. The preceding discussions for FIG. 9A and FIG. 9B apply to FIGS. 10A and 10B with the left/port and right/starboard directions reversed. With FIG. 10B's starboard deployment, it is quiet region 960 which is noticeably longer and wider than in FIG. 10A.

Certain embodiments of the present disclosure, including that shown in FIG. 9B and FIG. 10B, achieve their improved asymmetric wake not by delaying the convergence of the wake behind the hull of the boat, but by relocating the port and starboard disturbances from their traditional locations relative to the longitudinal axis of the hull.

Referring again to FIGS. 10 through 12 of U.S. Pat. No. 3,200,782 to Walden, and FIGS. 13a and 13b of U.S. Pat. No. 9,260,161 to Gasper, both of these references illustrate using vertically oriented trim tab elements to widen the "flow of water past the transom". In the words of Gasper, water from the two sides is "disrupted . . . causing it to converge . . . beyond its natural intersection" (see FIGS. 13A, 13B, and 13C) and "delaying convergence . . . to a point further from the transom" (see Col. 12, Lines 33-34).

By way of differentiation, some embodiments of the present disclosure do not rely upon widening the "flow of water past the transom" nor "delaying convergence to a point further from the transom". As shown in FIGS. 9B and 10B, when certain embodiments of the present disclosure induce yaw rotation in the hull, the convergence (where port disturbance 910 and starboard disturbance 920 first meet) occurs at the same or even less distance behind the transom of the hull as in FIGS. 9A and 10A when no yaw rotation was induced. Instead, such embodiments use the vertical sides of the hull to render port disturbance 910 and starboard disturbance 920 asymmetric, which then yields the desired asymmetric wake behind the hull of the boat.

The deployment of this embodiment on the port (left) side of the hull causes starboard disturbance 920 to relocate from its traditional location on the starboard (right) side of longitudinal axis 905 in FIG. 9A, to the port (left) side of longitudinal axis 905 in FIG. 9B. The convergence—the intersection—of the two disturbances is not delayed, and still occurs closely behind the transom. But the direction of starboard disturbance 920 has been shifted significantly, moving the froth and churn of the water which truncated quiet region 970 in FIG. 9A to the other side of longitudinal axis 905 where it no longer interferes with quiet region 970. The result is clearly visible in the increased width and especially length of quiet region 970 in FIG. 9B.

The same effect occurs on the port (left) side of the wake when this embodiment is deployed on the starboard (right) side of the hull. Returning again to FIG. 10B, it is now port disturbance 910 whose froth and churn have been moved to the opposite side of longitudinal axis 905, eliminating the interference that narrowed and shortened quiet region 960 in FIG. 10A.

As the foregoing description and figures explain, various embodiments of the present disclosure can deliver desirable asymmetric wakes using various techniques. This array of options gives the present disclosure increased flexibility, allowing its operation to be implemented in different ways for different hulls depending upon the preference of the boat engineer(s).

Some embodiments of the present disclosure use fixed angles of retraction and employment for the main tab(s) and/or yaw tab(s). Other embodiments employ multiple, discrete angles of deployment. Still others offer a continuum between full retraction and full deployment. A combination of such deployment options may be used, with different options on each of the subtabs in an overall trim tab. As with size, shape, and other physical characteristics noted earlier, the present system has a broad spectrum of applicability and the specifics of each embodiment may be obtained through pure engineering, empirical analysis, or both.

In some embodiments, the main tab 210 and yaw tab 240 of the dimensions shown in FIG. 3 may be employed on a Mojo Pro model boat manufactured by Skie's Choice of Maryville, Tenn. The Mojo Pro is a twenty three foot boat with a dry weight of 4,400 lbs. The boat has a ballast system that adds up to 3,000 lbs of additional weight to the boat. Further, this model boat has additional capacity for 2,500 lbs of passengers or gear.

In some embodiments, the main tabs are selected to impart sufficient roll to the hull and the yaw tabs are selected to impart sufficient yaw to the hull. A sufficiently large displacement (e.g. a boat loaded with ballast, passengers, and gear) may achieve the desired wake asymmetry with less reliance on the size and shape of the main and yaw tabs. With less displacement (e.g. the boat is not fully loaded) the positions of the main tabs and yaw tabs may be adjusted to optimize the wake asymmetry.

As the starboard and port main tabs and yaw tabs are deployed down into the water they not only roll or yaw the boat, but they also create lift. Lift acts against the weight, and thus the displacement, of the boat. In some embodiments, operation begins with filling the ballast system to 100% and setting the starboard and port main tabs to 0% deflection. Then, one of the main plates is moved down slowly until sufficient hull roll is achieved to clean up the wake on the desired side.

In some embodiments, operation continues by adjusting the yaw tab until its induced hull yaw creates a surfable wake by optimizing the tradeoff between displacement (of the hull) and lift (from the main and yaw tabs).

In some embodiments, a center trim tab (not shown) is provided between starboard trim tab 120 and port trim tab 110. This center trim tab may be operated independently of, or in synchronization with, starboard trim tab 120 and port trim tab 110 as conditions warrant.

In some embodiments, the yaw tabs are angled to keep edges from shearing water as water passes the side of the hull. In some embodiments, the main tabs are tapered to be longer on their inboard sides. With this tapered shape of the main tab, water flows with reduced turbulence off the main tabs 210 and meets with the water flowing off the middle wake tab.

In some embodiments, when the boat takes off, the starboard and port trim tabs (and middle wake tab, if provided) are all automatically moved down by the controller 130 to create extra lift to improve initial hull acceleration, by reducing the drag of the hull in the water.

In some embodiments, the deflections or sizes of the port trim tab 110 and starboard trim tab 120 are asymmetrical to account for propellor rotation. Propeller rotation affects surf waves. The propeller rotation twists water causing water to flow naturally in one direction. This flow also creates torque and makes it harder to roll the boat one way than the other. The use of asymmetrical port trim tab 110 and starboard trim tab 120 can help alleviate these propeller effects.

Some embodiments provide default deflection percentages that are employed by the controller 130, for example. For example, when it is desired to surf on the port side, the starboard side main tab actuator 230 may be preset to move to 60% deflection, and the yaw tab actuator 260 may be preset to move to 100% deflection. Alternately, when it is desired to surf on the starboard side, the port side main tab actuator 230 may be preset to move to 75% deflection, and the yaw tab actuator may be set to move to 100% deflection. The reason for the different percentages is because of propeller rotation.

In some embodiments, the boat has to be rolled further to one side, or yawed further to one side, to create a similar shaped wave than if there were no propeller effect. Such dissimilar amounts of rotation around the axes of the hull may be stored by some embodiments of controller 130. In certain embodiments, these dissimilar rotation amounts may be automatically integrated by controller 130 such that the operator of the wakeboat need not overtly consider them. In these embodiments controller 130 can be configured with the specifics of the boat in which it is installed and automatically adjust operator-specified rotation magnitudes to provide substantially similar behavior from the same numeric values.

While not always necessary, some embodiments of the present disclosure may benefit from adjustments to the hull which ease the inducement of rotation around the roll and/or yaw axes. For example, longitudinal hull chines—often employed to improve hull tracking—may be revised to allow more freedom of yaw rotation. Likewise, stabilizing chines which resist hull roll may be altered to improve the ability to impart rotation around the roll axis. Those skilled in the art will recognize these and other hull engineering decisions as they integrate various embodiments of the present disclosure into their boat designs. Reference has already been made to U.S. Pat. No. 9,828,075 to Hartman. Therein is described several techniques for measuring the yaw angle of a boat hull. Such yaw measurement techniques can be used in combination with some embodiments of the present disclosure to create a closed loop yaw management system. As noted in '075 to Hartman, "Upon deriving the yaw angle as described above, some embodiments of the present disclosure use the yaw angle value to control the hull of the wakeboat. Referring to FIG. 9, system 154 can selectively control trim plates via connection Trim plate(s) power and sensing 414 to alter the yaw angle of the hull. The trim plates thus controlled may be oriented vertically, horizontally, or any other orientation suitable to the specific embodiment . . . . System 154 can repeatedly measure the yaw angle and apply ongoing adjustments to the hull to compensate for changing conditions" (see Col. 25, Lines 9-25).

The system of FIG. 1 may selectively include a yaw detector such as one of the yaw sensors, and/or employ one of the yaw sensing techniques, described in incorporated U.S. Pat. No. 9,828,075 to Hartman. While multiple yaw sensors and techniques are shown, in some embodiments only one type is employed. In other embodiments multiple types of sensors and techniques are employed. In some embodiments, a yaw detector comprises accelerometers 190 and 192. In some embodiments, a yaw detector comprises a fin type sensor 175. In some embodiments, a yaw detector comprises a rudder sensor 145 associated with rudder 146. In some embodiments, a yaw detector comprises trim tab sensors 115 and/or 125. In some embodiments, a yaw detector comprises hull pressure sensors 180 and/or 185. In some embodiments, a sensor comprises a GPS module 135.

Referring to FIG. 1, some embodiments include controller 130 which selectively communicates with actuator 230 and actuator 260 on each trim tab in the embodiment. Controller 130 comprises a memory and other circuitry as necessary to interface with one of more of actuator 230 and actuator 260. In some embodiments, controller 130 may include a user interface whereby an operator can interact directly with controller 130.

In some embodiments, controller 130 includes one or more electrical interfaces which enable it to selectively communicate with other controllers, systems, modules, and devices. These interfaces may comprise one or more of the following: Controller Area Network (CAN) interface, any of the various versions of Ethernet interface, any other wired interfaces whether standard or proprietary, optical interfaces, and wireless interfaces.

In some embodiments, controller 130 is not limited to operating the actuators associated with the present disclosure. The functions and features of controller 130 may be integrated into other controllers, or controller 130 may include functions and features otherwise associated with other controllers.

Certain embodiments use a single actuator to deploy both main tab 210 and yaw tab 240. In these embodiments a mechanical linkage coordinates the motion of main tab 210 and yaw tab 240, as imparted by the single actuator. This may be advantageous in embodiments, including retrofits to existing boat hulls, where space is limited or where connection 160 and/or connection 170 of FIG. 1 are limited in their capacity.

Some embodiments are one-sided, e.g. they do not employ the trim tabs of the present disclosure in multiple locations. In some applications a single main tab 210 with yaw tab 240 is sufficient to achieve the desired functionality. For example, a wakeboat dedicated to wakesurfing only on one side may not require multiple trim tabs of the present disclosure, leaving more room available at the transom for other apparatuses. The present disclosure is suitable for use with any number of its trim tabs to achieve the desired behavior of hull 100.

Figure 11:
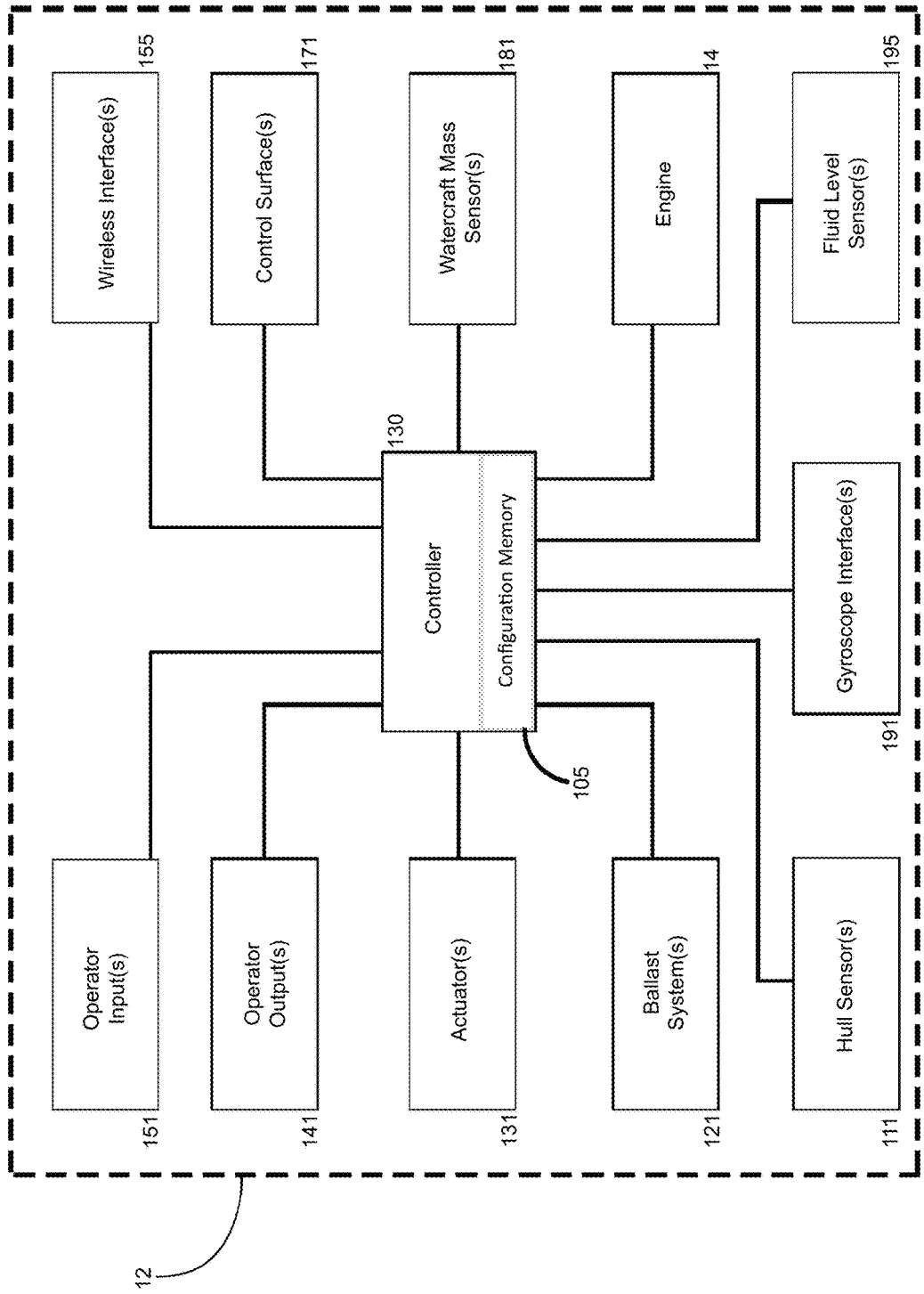
FIG. 11 shows a controller and associated subsystems according to some embodiments of the disclosure.
Figure 12:
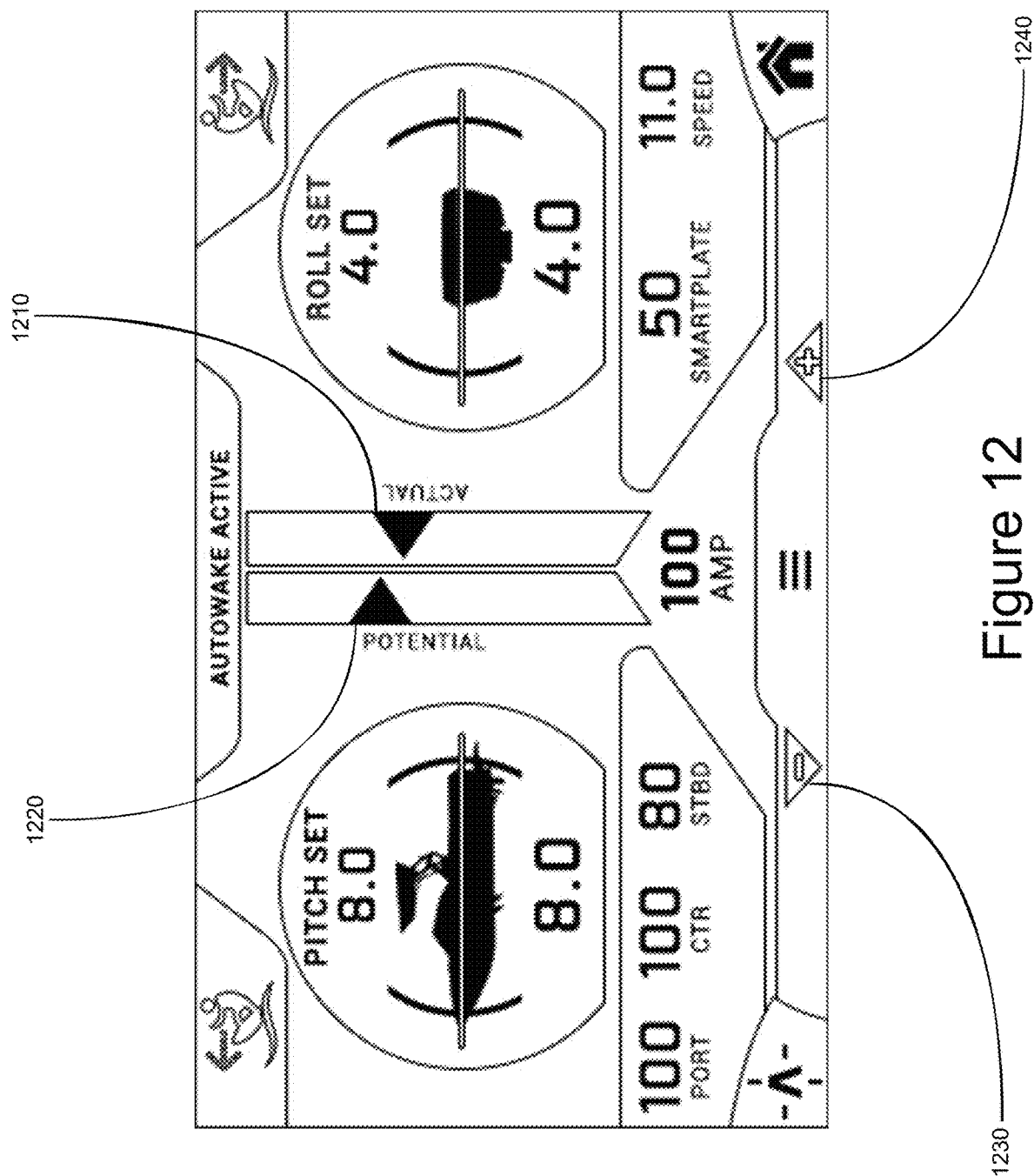
FIG. 12 shows a display with touch-sensitive regions according to some embodiments of the disclosure.

FIGS. 11 and 12 correspond to FIGS. 2 and 7, respectively, of above-incorporated U.S. patent application Ser. No. 15/824,787 (now U.S. Pat. No. 9,950,771).

FIG. 11 shows a system 10 in accordance with various embodiments. Referring to FIG. 11, controller 130 may interact with some or all of the various other components, systems, and subsystems of system 12, if and when present on the wakeboat 9. System 12 selectively comprises any quantity of any of the following: hull sensors 111 such as draft, velocity, depth of water below the hull, heading, bearing, and angles of roll/pitch/yaw; ballast systems 121 for increasing or decreasing mass on the wakeboat 9; actuators 131 run by electricity, hydraulics, pneumatics, or other power sources; operator outputs 141 such as analog and digital gauges, graphical screens, indicators, lights, and acoustic transducers; operator inputs 151 such as touchscreens, switches, buttons, and knobs; wireless interfaces 155; hydrodynamic control surfaces 171; watercraft mass sensors 181; gyroscope interface(s) 191; engine 14 and associated parameters such as RPM, temperatures, pressures, control settings such as throttle percentage, and fuel flow rates; and fuel, water, and other fluid level sensors 195.

FIG. 12 illustrates one example of wakeboat operator input and output systems including displays of potential and actual performance. The display of FIG. 12 is a touchscreen, in some embodiments, and includes indication (output) and control (input) of parameters such as hull pitch angle, hull roll angle, control surface settings, vessel velocity, and so forth. The center of this display includes Highest Available Potential Indicator 1220 (labeled "POTENTIAL") and Current Performance Indicator 1210 (labeled "ACTUAL"). In some embodiments, operator adjustment of the present performance level can be effected via touching and dragging Current Performance Indicator 1210 to the desired level. In other embodiments, the present performance level can be modified using the "+" 1240 and "−" 1230 arrows at the bottom of the touchscreen display. Some embodiments of the present disclosure enable the use of multiple operator input techniques so any combination of the above, or additional, approaches may be supported.

A variety of surf mode operator inputs are employed by some embodiments of the present disclosure. FIG. 12 shows one example. Actuation of surf operator input 1250 can selectively effect a surf left configuration of the hull in the surrounding water by selective positioning of the trim tabs. Likewise, actuation of surf operator input 1260 can selectively effect a surf right configuration of the hull in the surrounding water by selective positioning of the trim tabs.

A further enhancement, provided by some embodiments of the present disclosure, is the ability of controller 130 to store the value represented by Current Performance Indicator 1210 in a configuration memory 105 and later recall it for automated or semi-automated duplication. Some embodiments of the present disclosure may store the value represented by Current Performance Indicator 1210 in configuration memory 105 together with many other configurable aspects of the wakeboat's operation including but not limited to control surface parameters and/or hull speed.

Some embodiments of the present disclosure employ a gyroscope-type assembly to generate a rotational force on one or more axes of hull 100. Such a gyroscope assembly may be used in addition to, or in replacement of, other rotational force techniques such as trim tabs and yaw tabs as described elsewhere in this disclosure.

Gyroscopes have been used to reduce hull rolling caused by wind and wave motion. An example is the VEEM Gyro 120SD (VEEM Gyro, 22 Baile Road, Canning Vale, Western Australia 6155, Australia). However, such traditional applications of gyroscopes to hull control have been fundamentally limited. As noted by VEEM:

"One characteristic of a gyrostabilizer is that it cannot sustain a stabilizing torque for an extended time (they are great at opposing motion, but when the motion stops, they stop creating torque). This means that steady list angles due to wind heel or induced during turning manoeuvres, cannot be corrected by a gyro acting alone. Fortunately, there is a highly efficient solution to this. In order to optimise trim (to maximise fuel efficiency, and speed) and to manage list angles, it is recommended that the gyro be installed with either transom flaps or interceptors." (https://veemgyro.com/gyro-vs-fins-whats-difference)

In other words, traditional marine gyroscopes are restricted to opposing short-term hull motion (such as wind/wave induced rolling). They cannot generate a sustained force to affect, offset, or induce a continuous "heel" or "list" (nautical terms for a hull roll angle). Since their own products cannot achieve this, the manufacturer(s) of traditional marine gyroscopes recommend that "transom flaps or interceptors" (commonly known as trim tabs) be employed if continuous force around the roll axis is desired or necessary.

Some embodiments of the present disclosure improve upon the design and use of traditional marine gyroscopes to deliver the "steady list angles" (more accurately stated: continuous rotational force around the roll/longitudinal axis of hull 100) previously unattainable by marine gyroscopes. Some embodiments can also employ these improvements to impart such a continuous force around other axes of hull 100, as may be advantageous to the specifics of the application.

Figure 13:
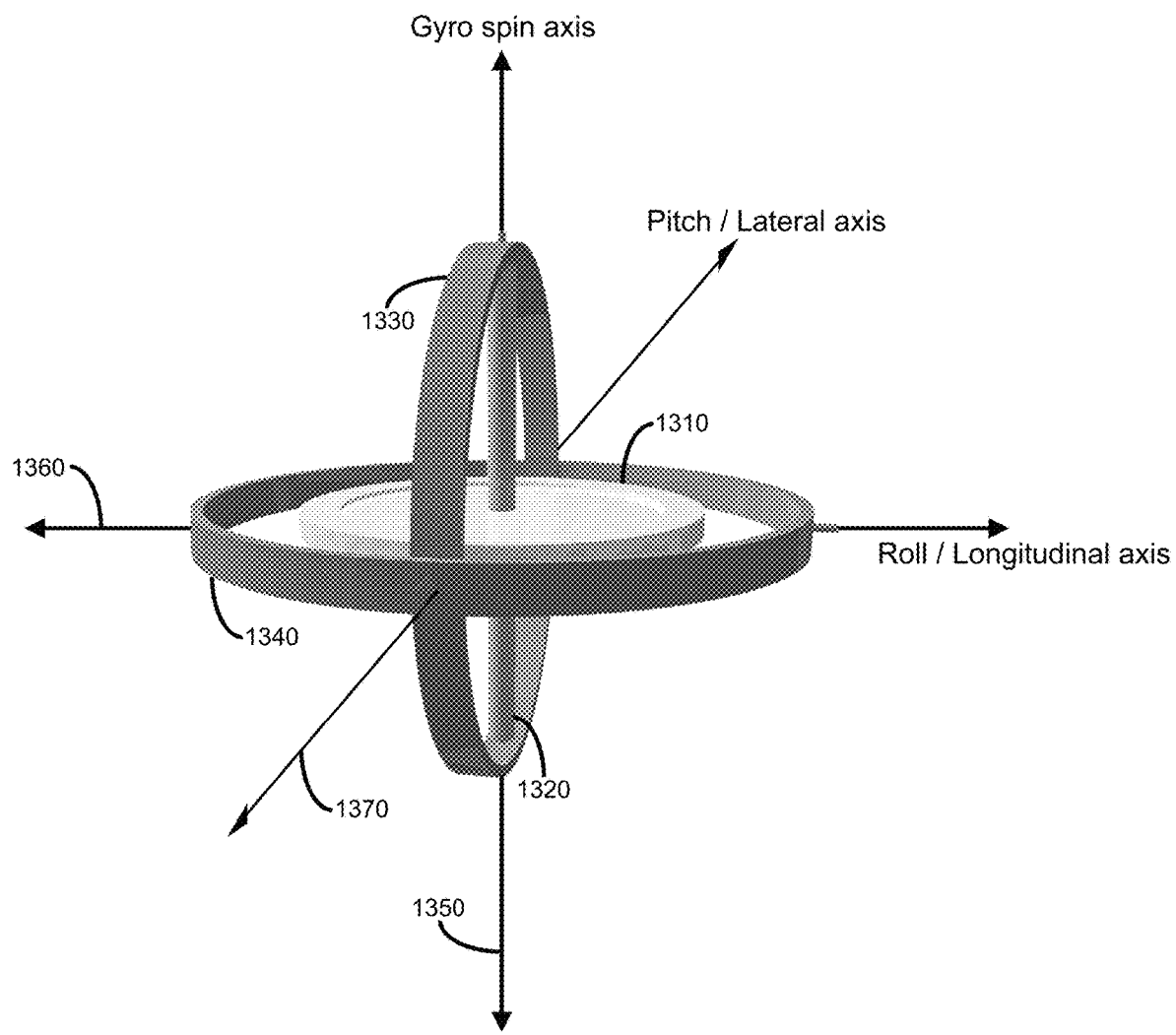
FIG. 13 is a perspective view of a gyroscope assembly according to some embodiments of the disclosure.

To help with comprehension of the improvements of the present disclosure, FIG. 13 illustrates a traditional gyroscope assembly, similar to the toy-like gyroscopes commonly used to illustrate gyroscopic principles to school students. The details of the gyroscope construction may be specific to a given application. Such details are omitted for clarity here and in the Figures so that the more important concepts of the present disclosure may be illustrated clearly.

Rotor 1310 spins on shaft 1320 around axis 1350 (labeled "Gyro spin axis") within inner frame 1330 so rotor 1310 establishes a reference plane. In a traditional gimbaled gyroscope, inner frame 1330 can rotate on axis 1370 (labeled "Pitch/Lateral Axis") within outer frame 1340. Likewise, outer frame 1340 can rotate on axis 1360 (labeled "Roll/Longitudinal axis").

The result is that inner frame 1330 and outer frame 1340 may rotate about their axes subject to the forces that act upon them. In a static condition (e.g. rotor 1310 is not rotating), the orientation of all gyroscope axes may be freely and independently altered. This situation changes when rotor 1310 is spun on Gyro spin axis 1320 because the angular momentum of rotor 1310 seeks to remain constant in both magnitude and direction. Stated another way, rotor 1310 seeks to maintain the orientation of axis 1350 in 3D space. Any force acting upon it which attempts to change the orientation of axis 1350—and thus shaft 1320, and inner frame 1330 to which shaft 1320 is pivotally connected—results in a reactive force in keeping with Newton's Laws of Motion, and specifically Newton's Third Law of Motion ("For every action there is an equal and opposite reaction").

However, gyroscope physics introduces an important and somewhat nonintuitive effect to the normal behavior of Newton's Third Law. This effect, known as "gyroscopic precession", is a phenomenon occurring in rotating bodies in which an applied force is manifested 90 degrees later in the direction of rotation from where the force was applied. Said another way, gyroscopic precession causes the aforementioned reactive force to be rotated 90 degrees from the initiating force. Energy is still conserved and Newton's Third Law is not violated; the reactive force is still present, just moved to a different output axis.

The precession effect is extraordinarily useful because it allows a gyroscope to act as a force vector translator. Rotational force imparted to one axis can be translated to rotational force on a different axis.

Referring again to FIG. 13, if inner frame 1330 is rotated about pitch/lateral axis 1370, gyroscopic precession translates that force into rotation of outer frame 1340 about roll/longitudinal axis 1360 (which is 90 degrees offset from the "input" pitch/lateral axis 1370). Both inner frame 1330 and outer frame 1340 are free to rotate about their respective axes, typically being mounted with low friction bearings.

Traditional marine gyroscopes employ this 90 degree translation to reduce transitory hull roll. The gyroscope is mounted to the hull via a hinge parallel to the pitch/lateral axis of the hull. Rotation of the gyroscope around this hinge is then translated 90 degrees to the roll/longitudinal axis. The magnitude of the transitory hull roll that can be accommodated is limited by the hinge travel.

As noted in the VEEM Gyro reference above, such traditional marine gyroscopes cannot generate a constant, ongoing rotational force. However, a constant ongoing rotational force is necessary to impart a constant roll angle to hull 100 which affects the left quiet region and/or right quiet region in the wake of the hull, and thus creates a surf left or surf right configuration. Transitory rotational forces can temporarily affect the roll angle of hull 100, but such effects are dissipated by the other forces constantly acting upon hull 100 including but not limited to friction with the water, hydrodynamic forces resulting from motion in the water, and the natural tendency of the mass of hull 100 to "find its balance" while floating in the water.

Thus an improvement to traditional marine gyroscopes is required if constant, ongoing rotational force is to be obtained for the creation and manipulation of surf left and/or surf right configurations of the wake.

Figure 14:
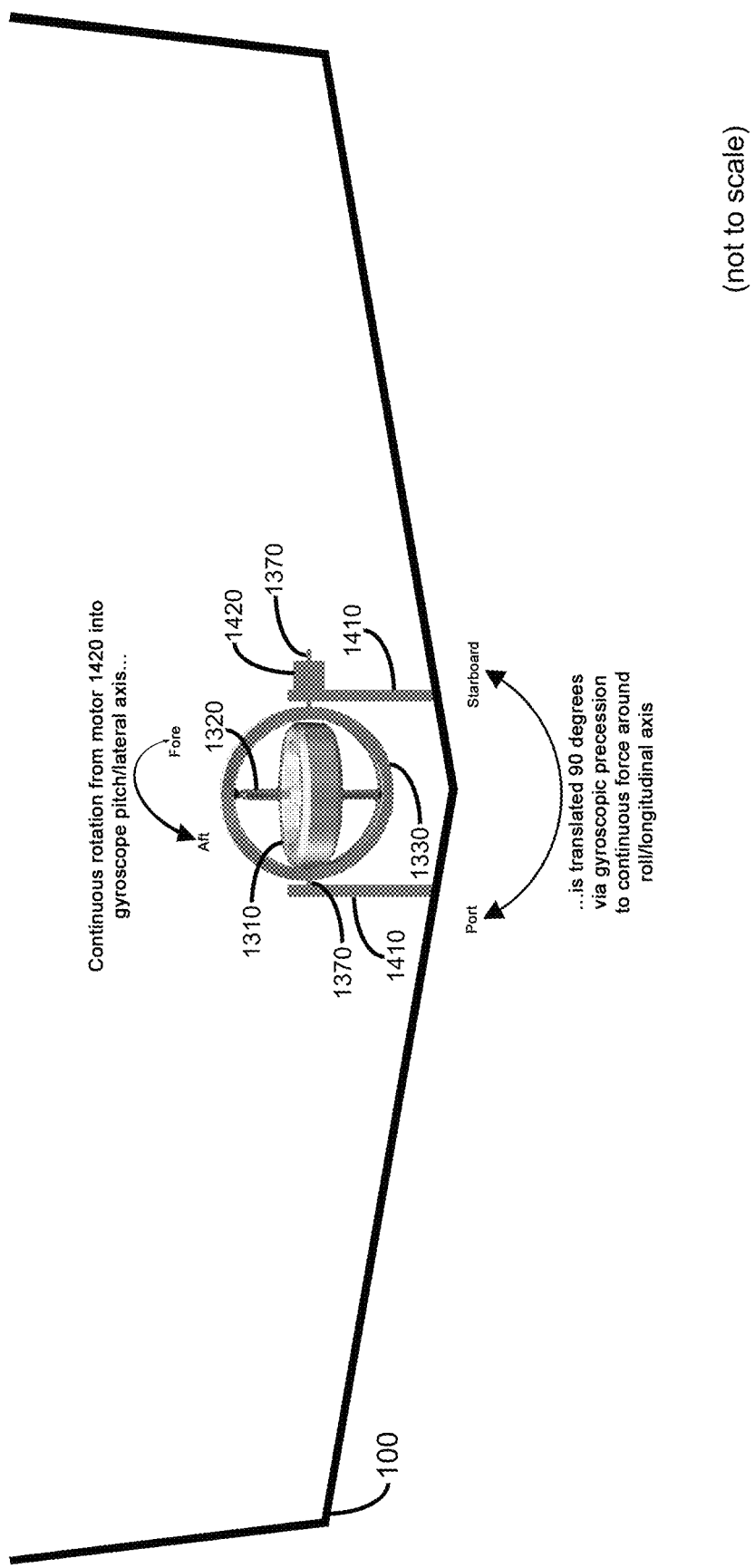
FIG. 14 shows a boat hull supporting a gyroscope for rotation according to some embodiments of the disclosure.

Some embodiments of the present disclosure achieve the required constant, ongoing rotational force by attaching the pitch/lateral axis of the gyroscope to the hull via a mount that accommodates continuous rotation. FIG. 14 illustrates one embodiment, wherein Pitch/Lateral axis 1370 is a shaft mounted to supports 1410 via fully rotatable mounts. Gyroscope frame 1330 is thus free to rotate continuously around Pitch/Lateral axis 1370.

In FIG. 14 frame 1330 is constrained from rotating freely around the Roll/Longitudinal axis of hull 100 due to frame 1330 being mounted to supports 1410. Any Roll/Longitudinal rotational force experienced by frame 1330 is conveyed through the Pitch/Lateral axis shaft and bearings to supports 1410 and thus to hull 100.

If frame 1330 is rocked fore and aft on its Pitch/Lateral axis, gyroscopic precession translates that rotational rocking motion 90 degrees and causes it to appear as a similar rotational rocking motion on the Roll/Longitudinal axis. However, as noted above, any Roll/Longitudinal force experienced by frame 1330 is conveyed to hull 100. Therefore, a rocking rotation of frame 1330 fore and aft causes a similar rocking rotation of hull 100 around its Roll/Longitudinal axis.

Rocking motion, like wind/wave induced rolling, is a transitory phenomenon and not a sustained rotational force. To achieve sustained rotational force, some embodiments of the present disclosure employ a motor to continuously rotate the gyroscope.

Referring again to FIG. 14, motor 1420 drives Pitch/Lateral axis shaft 1370 to rotate frame 1330, thus inputting rotational energy into the gyroscope system. Gyroscopic precession translates the input rotational energy 90 degrees to be output on the Roll/Longitudinal axis. Frame 1330 is constrained from rotating independently upon its Roll/Longitudinal axis by supports 1410 and hull 100, so the output rotational energy from the gyroscope system is transferred to hull 100 and hull 100 experiences a rotational force on its Roll/Longitudinal axis.

If frame 1330 is limited in the extent of rotation (as is true with traditional marine gyroscopes), only transitory rotational energy can be input on the Pitch/Lateral axis and thus only transitory rotational energy can be translated to the Roll/Longitudinal axis of hull 100. Simply stated, once the hinge limit(s) are reached in a traditional marine gyroscope, no further energy can be input in that direction on that axis.

Unlike traditional designs, embodiments of the present disclosure such as FIG. 14 do not limit the extent of rotation of frame 1330. As a result, energy can be continuously input to the driven axis. In the example of FIG. 14, the driven axis is the Pitch/Lateral axis and the source of the input energy is motor 1420. Continuous rotation of motor 1420 results in continuous rotation of frame 1330, which through precession translates to continuous rotational energy in the Roll/Longitudinal axis of hull 100.

"Continuous rotational energy in the Roll/Longitudinal axis" does not mean that hull 100 will capsize in the water. As described earlier in this disclosure, there are other forces acting upon hull 100 which seek to maintain its buoyant equilibrium. These forces can be thought of as "losses" in Engineering terms, and these losses are the reason that transitory rotational energy can temporarily rotate hull 100 around an axis but cannot maintain such an out-of-equilibrium orientation. To rotate and HOLD hull 100 at what would otherwise be an out-of-equilibrium orientation, the rotational energy must be continuous to overcome these losses on an ongoing basis.

Some embodiments of the present disclosure provide a closed loop control technique similar to that described for yaw management above. As mentioned earlier herein, system 12 of FIG. 11 may optionally include hull sensors 111 that can comprise sensors for roll, pitch, and yaw. System 12 may also control the speed and direction of motor 1420, and other parameters of the gyroscope system, via gyroscope interface(s) 191. Given the ability to sense roll, pitch, and yaw of hull 100, and the ability to affect rotation on one or more of these axes via the gyroscope system, system 12 of some embodiments may modulate the behavior of motor 1420 to achieve, restore, and/or maintain a desired rotation of hull 100 on one or more axes.

Some embodiments of system 12 may also support the storage and retrieval of gyroscope settings and other operational parameters in configuration memory 105 of controller 130. Such parameters may include factory defaults from the manufacturer, modified versions of said defaults as edited by end users, and/or fully custom entries created on the watercraft in question or imported via operator input(s) 151, wireless interface(s) 155, or any other technique suitable for the specifics of the implementation.

Some embodiments of the present disclosure permit rotation of frame 1330 in either direction, via rotation of motor 1420 in either direction. Rotation of frame 1330 in a given direction yields a predictable and repeatable rotational force to hull 100. This effect is symmetric: Rotation of frame 1330 in the other direction yields a predictable and repeatable rotational force to hull 100 in the other direction. In this manner, rotation of hull 100 may be achieved in either direction for a surf left or surf right configuration.

An additional advantage is that hull 100 may be swiftly changed from a surf configuration on one side to a surf configuration on the other side simply by reversing the rotation direction of frame 1330.

Embodiments of the present disclosure are not limited to a single mass of rotor 1310, nor a specific hull 100 or its mass, nor a specific motor 1420. The rotational energy/speed required from motor 1420 is a function of the relative masses of rotor 1310, hull 100 and its contents, the "losses" mentioned above, and potentially other factors. For example, greater rotational speed of motor 1420 may be preferable in circumstances where the mass of rotor 1310 could be advantageously reduced. The present disclosure thus gives wakeboat designers a broad spectrum of choices to optimize size, mass, and other parameters when employing embodiments of the present disclosure. Incorporation of the closed loop control technique described above may be helpful in more automated handling of natural variations in water conditions, the aforementioned Engineering "losses", and other factors including manufacturing tolerances from unit to unit.

Embodiments of the present disclosure are not limited to a single gyroscope nor a single axis. A single gyroscope may be employed to impart rotational energy to a first axis, such as the Roll/Longitudinal axis. Some embodiments employ a second gyroscope, with its spin axis 1320 reoriented to suitably change the angle of translation, to impart rotational energy to a second axis such as the Pitch/Lateral axis. Some embodiments employ a third gyroscope, with its spin axis 1320 reoriented to suitably change the angle of translation, to impart rotational energy to a third axis such as a Yaw/Vertical Axis.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments.

We claim:

1. A system for forming asymmetric surf wakes behind a wakeboat including a hull having a port side, a starboard side, an inside, an outside, a stern, a roll axis, a pitch axis, and a yaw axis, the hull being configured to float in water with a waterline on the outside of the hull, the hull when moving forward in the water creating a wake with a left quiet region and a right quiet region, the system comprising:
   a left trim tab pivotally supported by the hull proximate the port side of the stern for rotation about a first tab axis that is substantially parallel with the waterline when the hull is at rest in the water;
   a right trim tab pivotally supported by the hull proximate the starboard side of the stern for rotation about a second tab axis that is substantially parallel with the waterline when the hull is at rest in the water; and
   a gyroscope including a rotor and a frame, the rotor rotatably supported by the frame, the frame rotatably supported by the hull, the rotor configured to selectively spin within the frame on a first gyroscope axis, the frame configured to selectively spin within the hull on a second gyroscope axis which is non-parallel with the first axis.

2. The system of claim 1 wherein the spin direction of the gyroscope frame within the hull enlarges the left quiet region.

3. The system of claim 1 wherein the spin direction of the gyroscope frame within the hull enlarges the right quiet region.

4. The system of claim 1 wherein the gyroscope frame is supported by the hull to selectively rotate between a first direction, in which the gyroscope is configured to act on the hull so that the hull enlarges the left quiet region, and a second direction.

5. The system of claim 1 wherein the gyroscope frame is supported by the hull to selectively rotate between a first direction, and a second direction in which the gyroscope is configured to act on the hull so that the hull enlarges the right quiet region.

6. The system of claim 1 wherein the spin direction of the gyroscope frame within the hull is coordinated with the rotation of the left trim tab about the first tab axis and the right trim tab about the second tab axis.

7. The system of claim 1 wherein the spin speed of the gyroscope frame within the hull is coordinated with the rotation of the left trim tab about the first tab axis and the right trim tab about the second tab axis.

8. A method of manufacturing a wakeboat including a hull having a port side, a starboard side, an inside, an outside, a stern, a roll axis, a pitch axis, and a yaw axis, the hull being configured to float in water with a waterline on the outside of the hull, the hull when moving forward in the water creating a wake with a left quiet region and a right quiet region, the method comprising:
   pivotally supporting a left trim tab by the hull proximate the port side of the stern for rotation about a first tab axis that is substantially parallel with the waterline when the hull is at rest in the water;
   pivotally supporting a right trim tab by the hull proximate the starboard side of the stern for rotation about a second tab axis that is substantially parallel with the waterline when the hull is at rest in the water; and
   pivotally supporting a gyroscope frame by the hull, pivotally supporting a gyroscope rotor with the frame, selectively spinning the gyroscope rotor within the frame on a first gyroscope axis, and selectively spinning the gyroscope frame within the hull on a second gyroscope axis which is non-parallel with the first axis.

9. The method of claim 8 wherein the spin direction of the gyroscope frame within the hull enlarges the left quiet region.

10. The method of claim 8 wherein the spin direction of the gyroscope frame within the hull enlarges the right quiet region.

11. The method of claim 8 wherein the gyroscope frame is arranged within the hull such that, in operation, the gyroscope enlarges the left quiet region.

12. The method of claim 8 wherein the gyroscope frame is arranged within the hull such that, in operation, the gyroscope enlarges the right quiet region.

13. The method of claim 8 wherein the spin direction of the gyroscope frame within the hull is coordinated with the rotation of the left trim tab about the first tab axis and the right trim tab about the second tab axis.

14. The method of claim 8 wherein the spin speed of the gyroscope frame within the hull is coordinated with the rotation of the left trim tab about the first tab axis and the right trim tab about the second tab axis.

15. A system for forming asymmetric surf wakes behind a wakeboat including a hull having a port side, a starboard side, an inside, an outside, a stern, a roll axis, a pitch axis, and a yaw axis, the hull being configured to float in water with a waterline on the outside of the hull, the hull when moving forward in the water creating a wake with a left quiet region and a right quiet region, the system comprising:
   a left trim tab pivotally supported by the hull proximate the port side of the stern for rotation about a first tab axis that is substantially parallel with the waterline when the hull is at rest in the water;
   a right trim tab pivotally supported by the hull proximate the starboard side of the stern for rotation about a second tab axis that is substantially parallel with the waterline when the hull is at rest in the water; and
   a gyroscope including a rotor and a frame, the rotor being rotatably supported by the frame, the rotor being configured to selectively spin within the frame about a first gyroscope axis, the frame being rotatably supported by the hull for rotation about a second gyroscope axis, non-parallel with the first gyroscope axis, in a selective one of a first frame rotation direction, and a second frame rotation direction opposite the first frame rotation direction.

16. The system of claim 15 wherein the rotation direction of the gyroscope frame within the hull is selected to enlarge the left quiet region.

17. The system of claim 15 wherein the rotation direction of the gyroscope frame is selected to enlarge the right quiet region.

18. The system of claim 15 wherein the rotation direction of the gyroscope frame is selectable between the first frame rotation direction and the second frame rotation direction in response to a signal.

19. The system of claim 18 wherein the signal is one of electrical, mechanical, hydraulic, and pneumatic.

20. A system for forming asymmetric surf wakes behind a wakeboat including a hull having a port side, a starboard side, an inside, an outside, a stern, a roll axis, a pitch axis, and a yaw axis, the hull being configured to float in water with a waterline on the outside of the hull, the hull when moving forward in the water creating a wake with a left quiet region and a right quiet region, the system comprising:

tab means, for creating an adjustable asymmetric wake in the water by interacting with the water to controllably adjust both trim and yaw; and a gyroscope including a rotor and a frame, the rotor being rotatably supported by the frame, the rotor being configured to selectively spin within the frame about a first gyroscope axis, the frame being rotatably supported by the hull for rotation about a second gyroscope axis, non-parallel with the first gyroscope axis, in a selective one of a first frame rotation direction, and a second frame rotation direction opposite the first frame rotation direction, to affect the asymmetric wake.

* * * * *